M. TEETOR.
CALCULATING MACHINE.
APPLICATION FILED APR. 20, 1908.
1,252,738.
Patented Jan. 8, 1918.
19 SHEETS—SHEET 11.
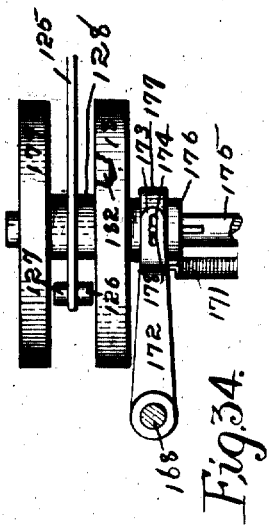
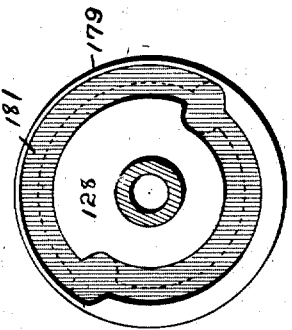
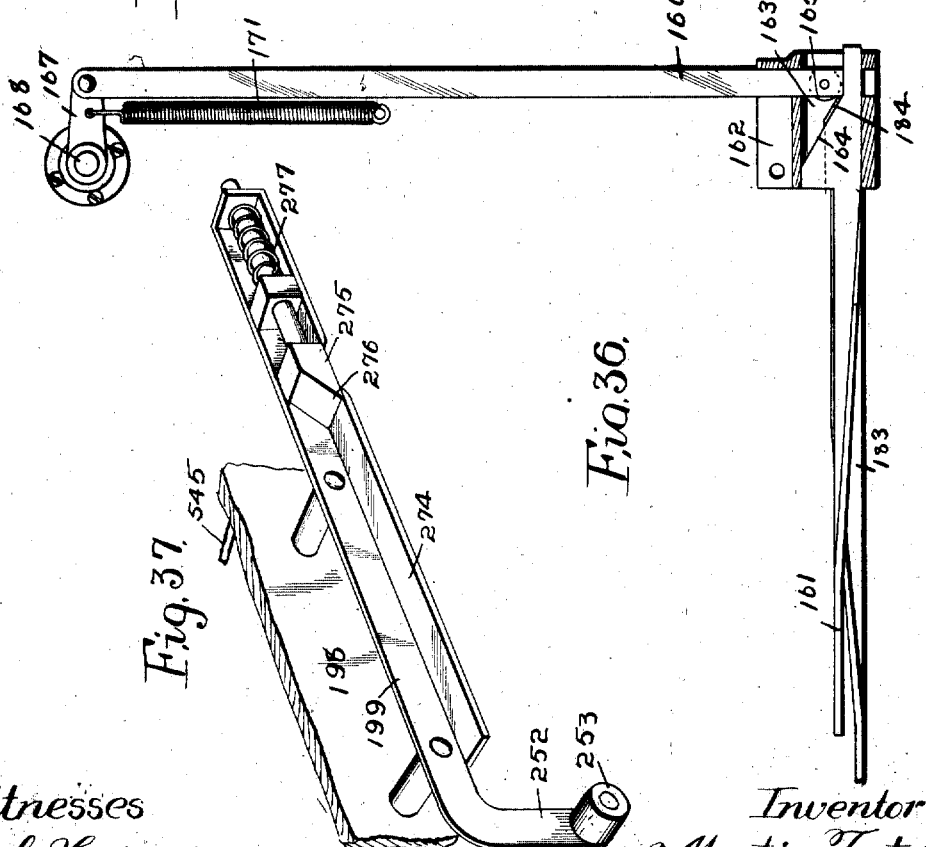
Witnesses
A. G. Hague
F. C. Dahlberg
Inventor
Martin Teetor
by Orwig & Kane Attys.

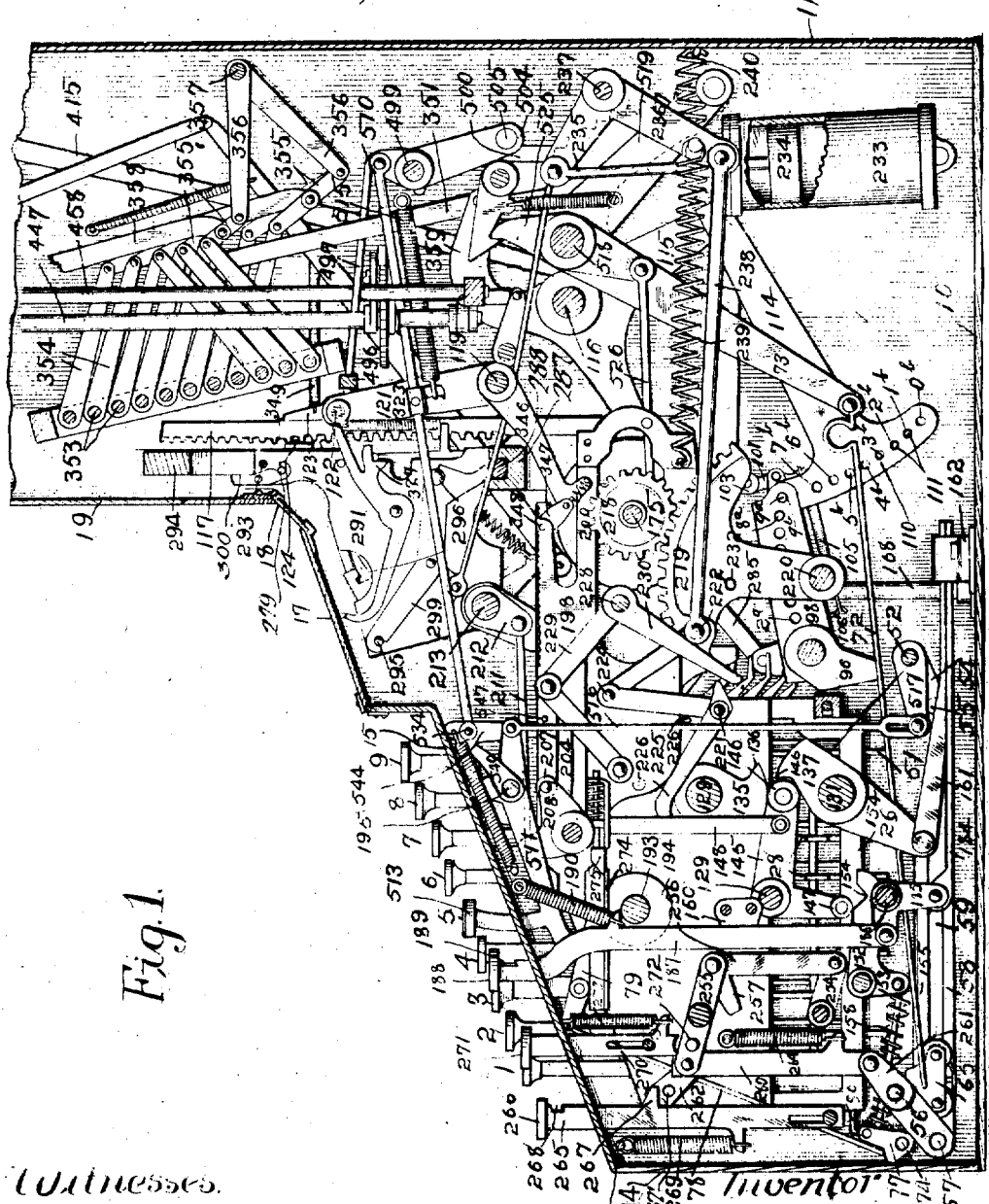

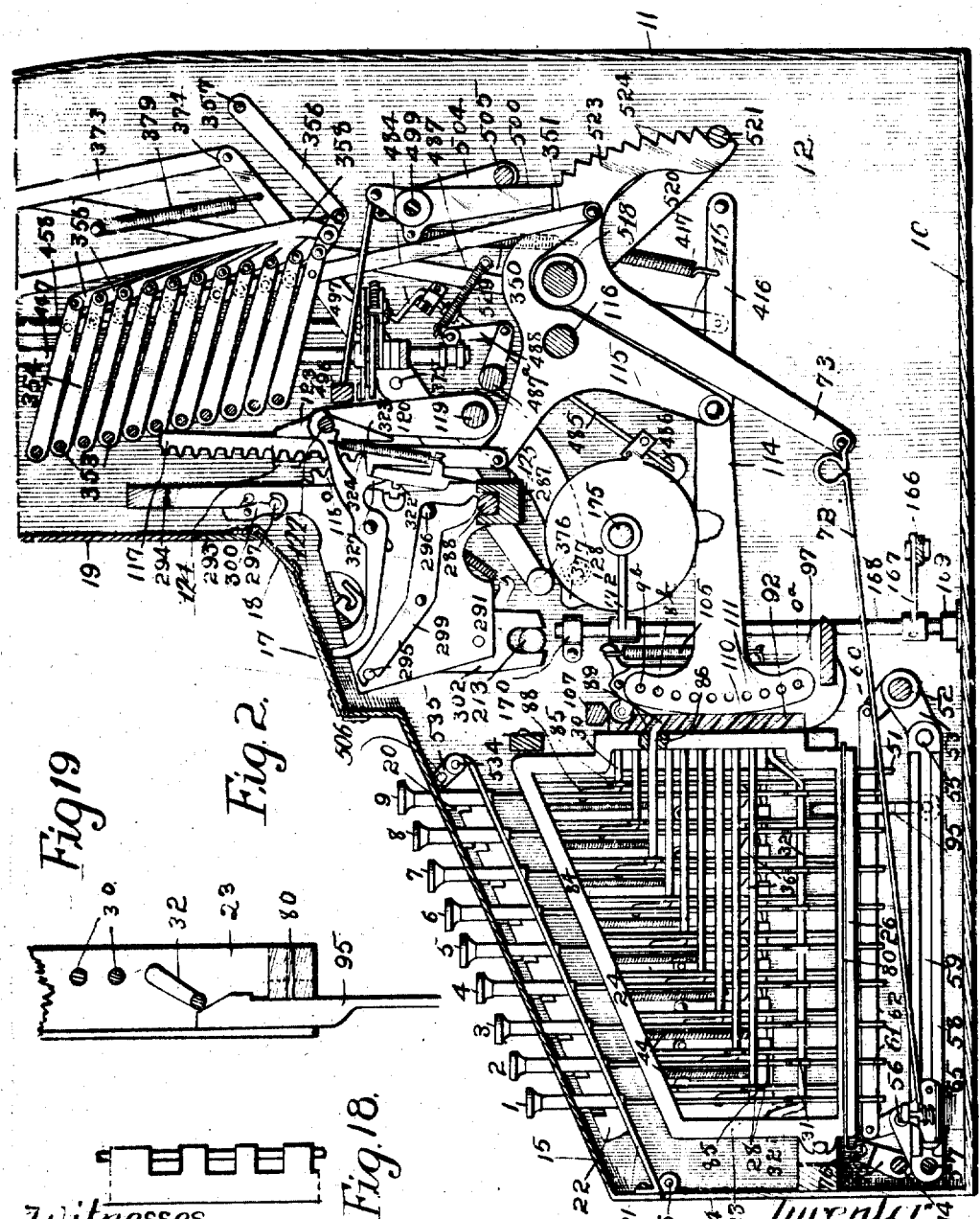

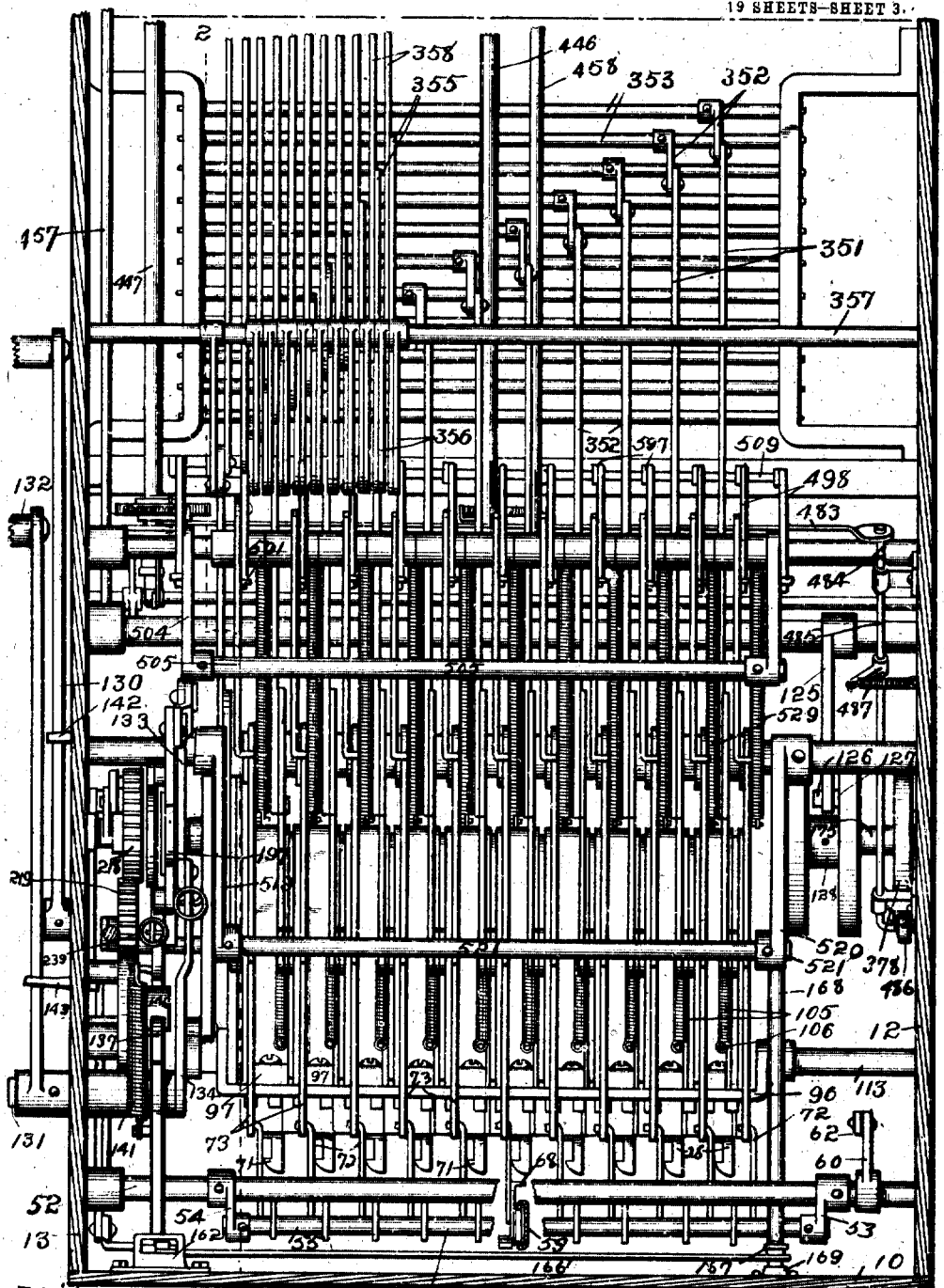

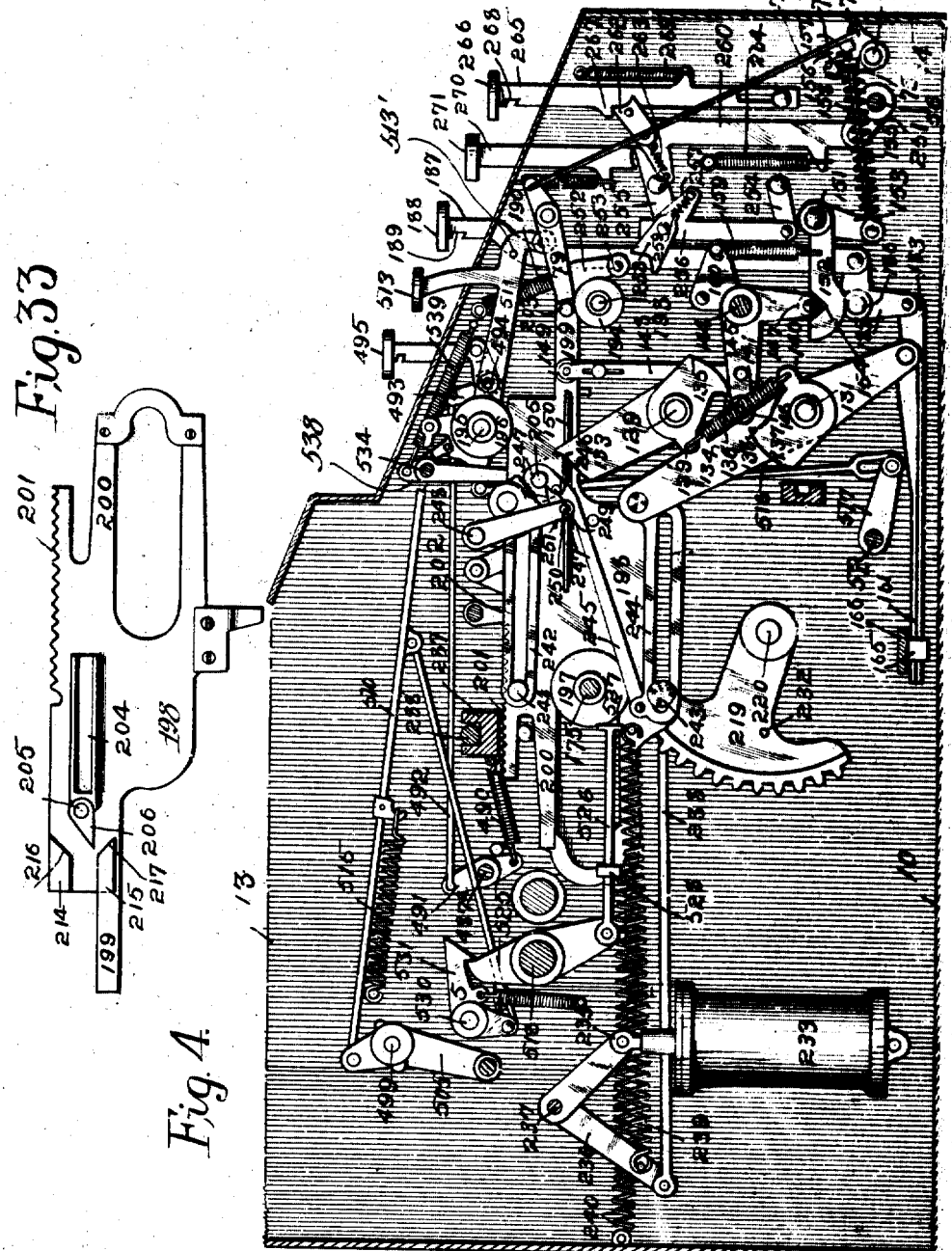

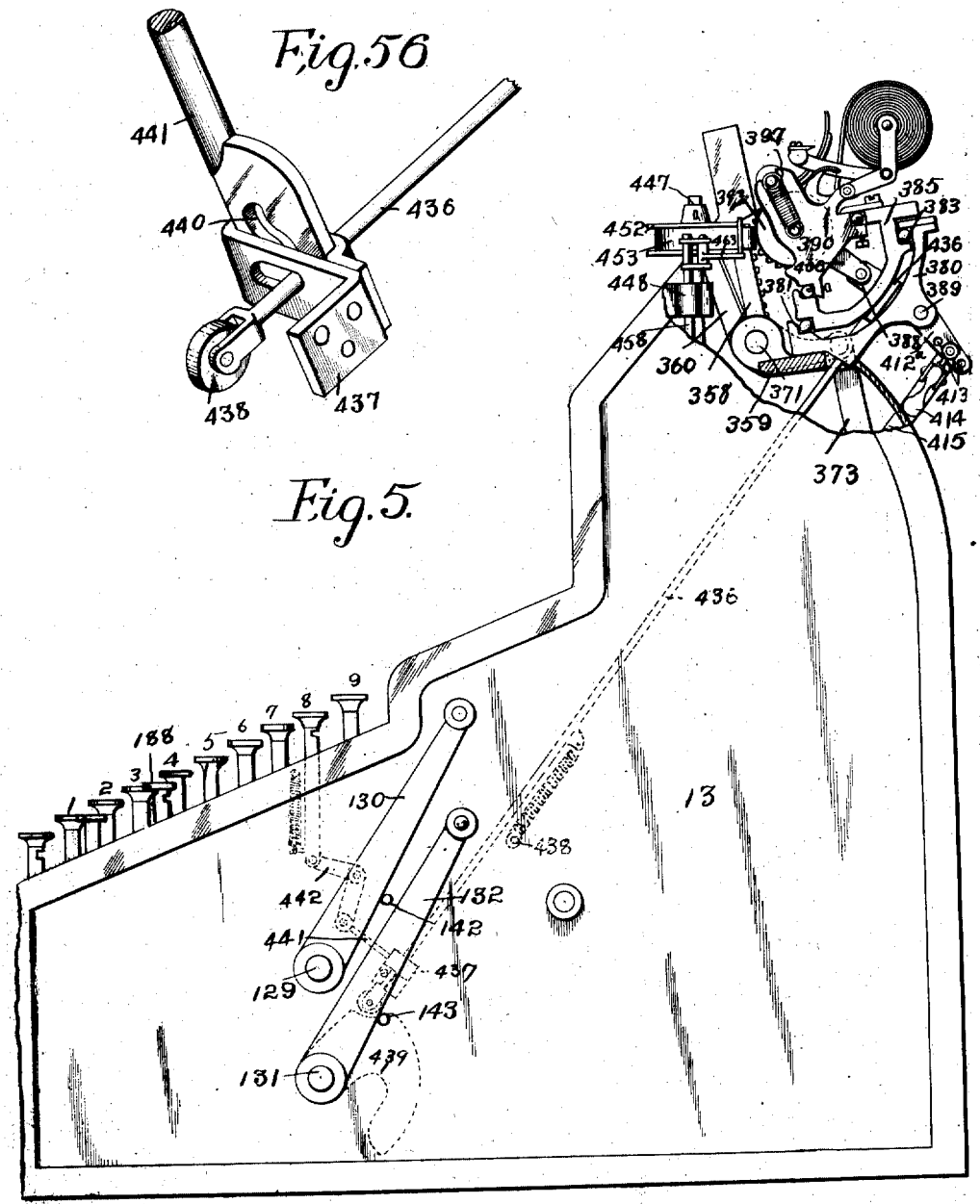

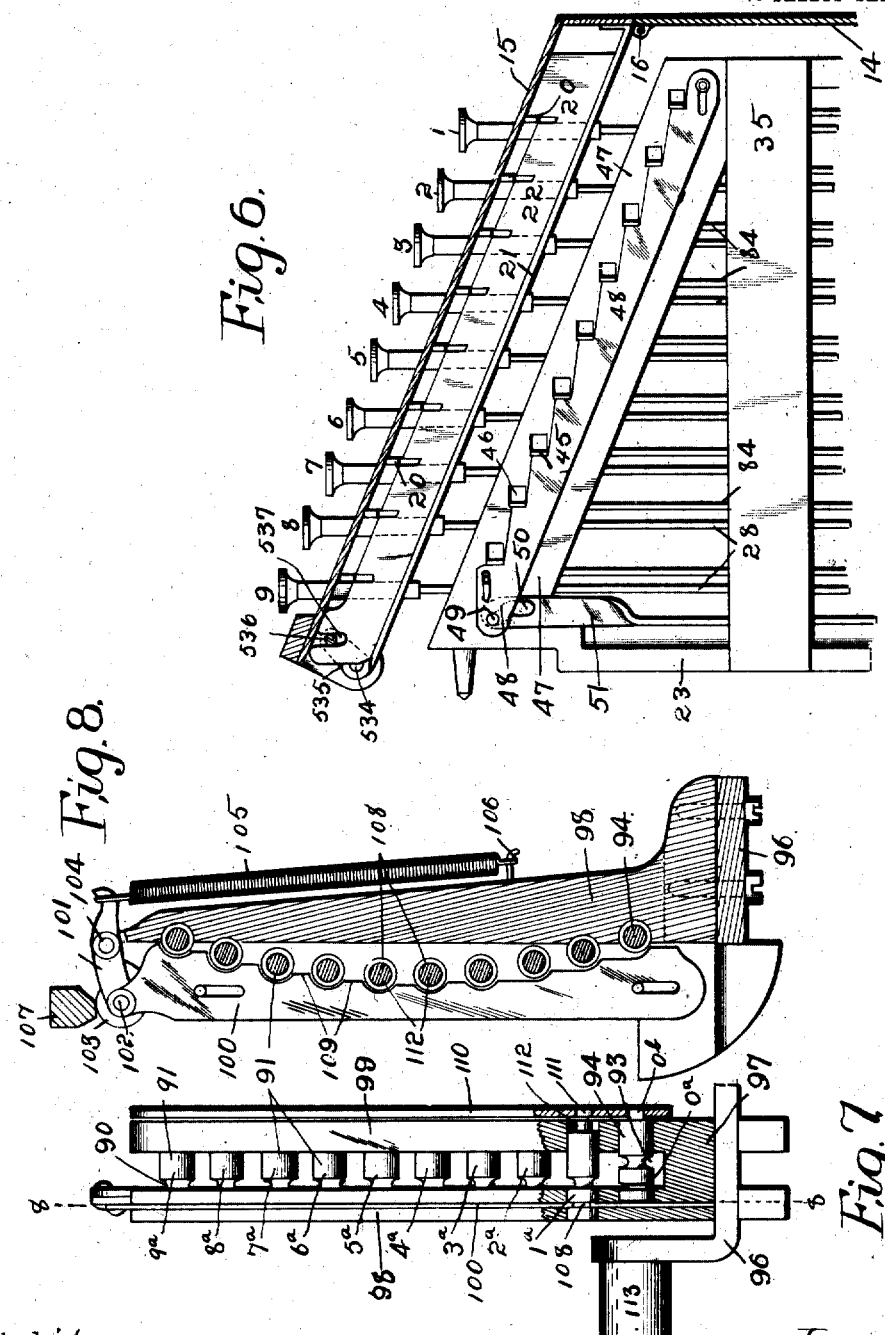

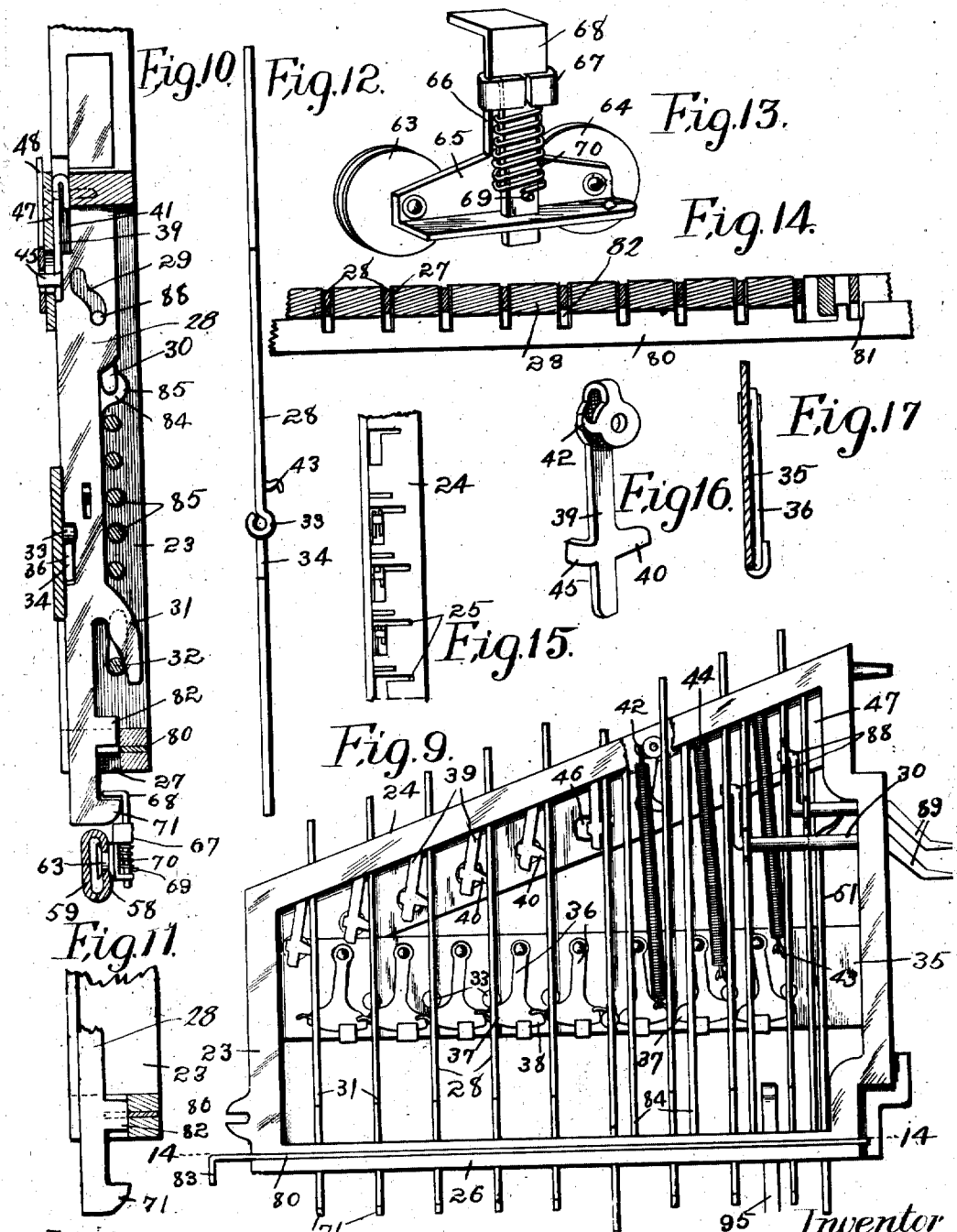

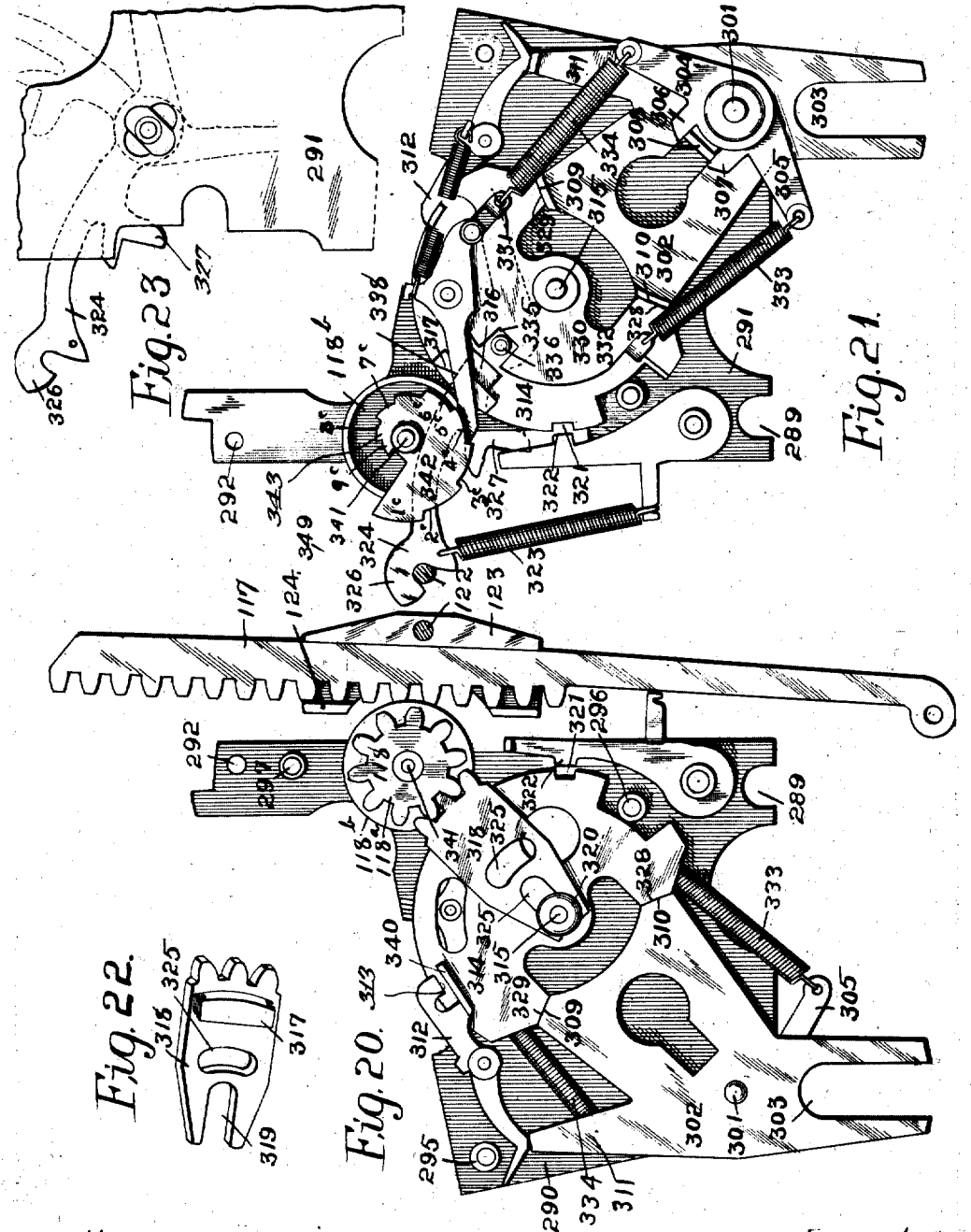

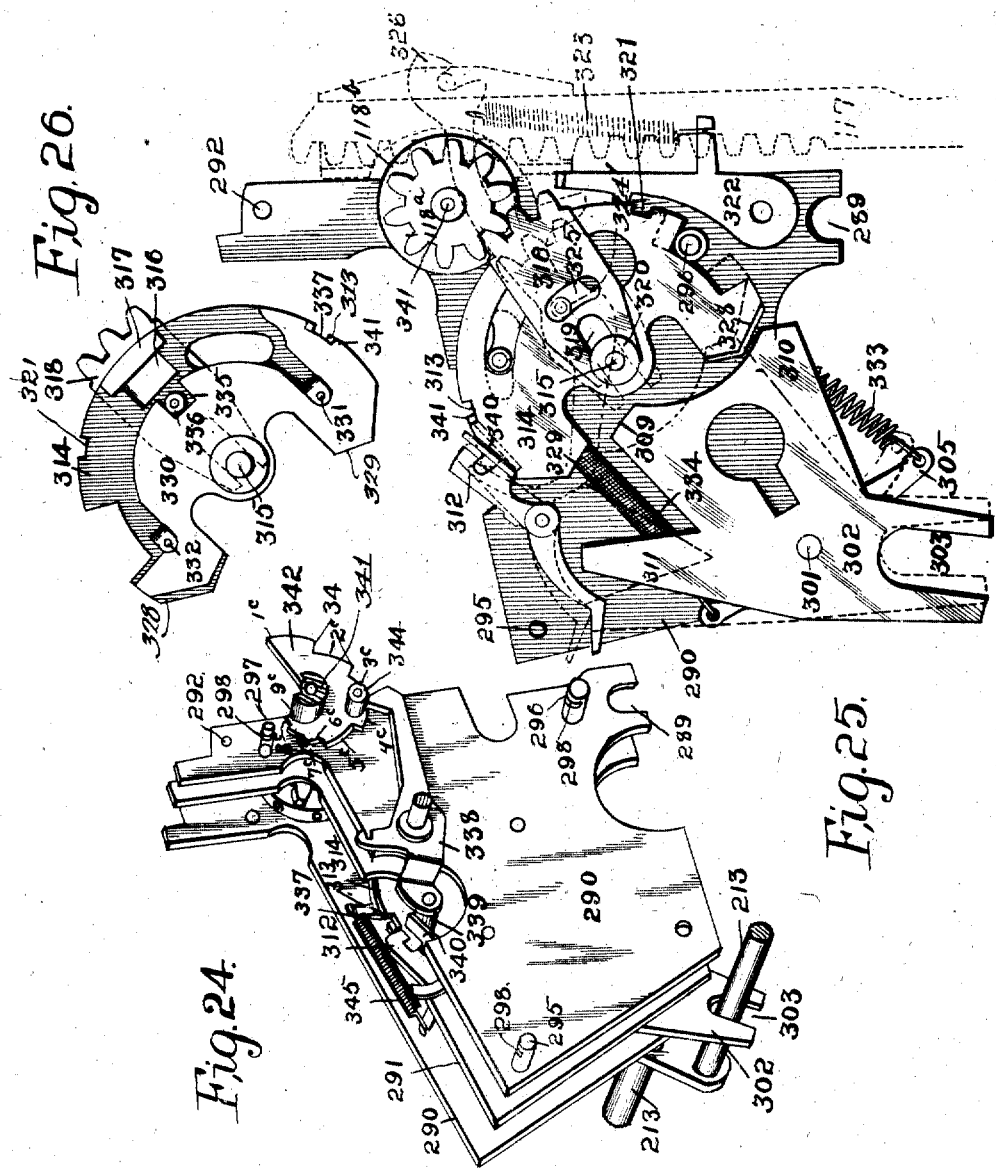

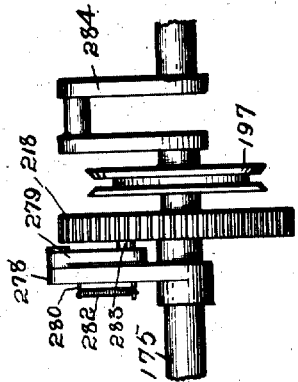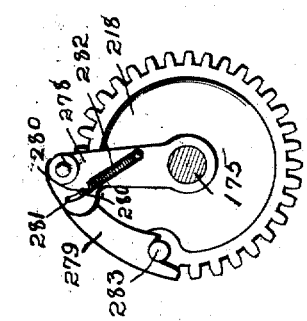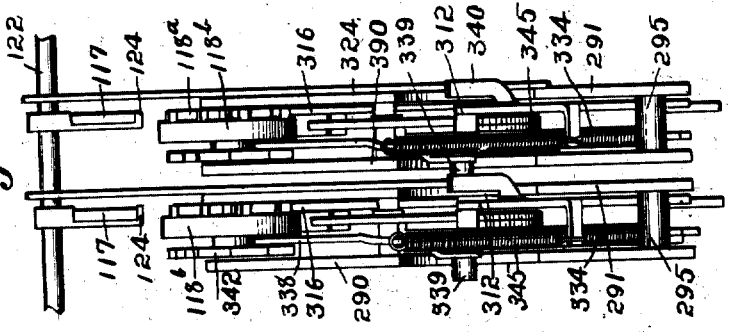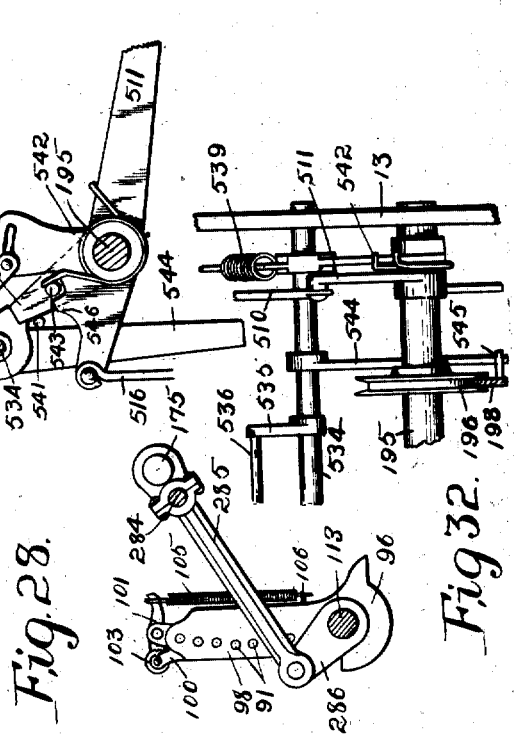

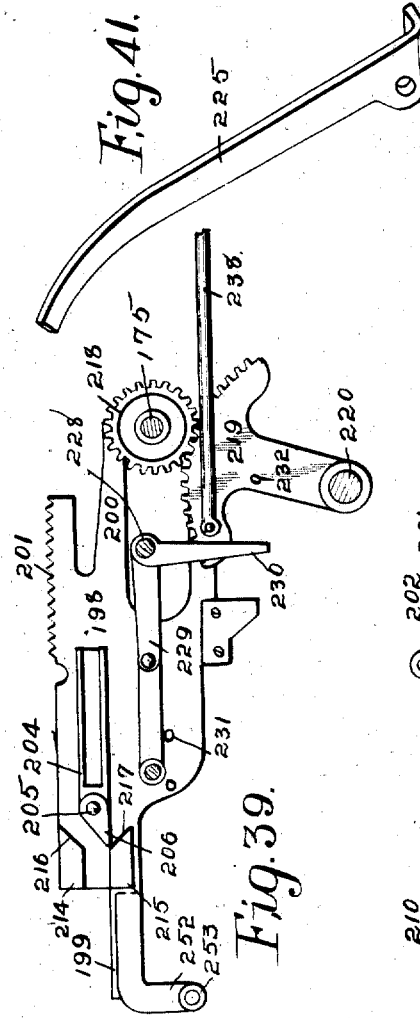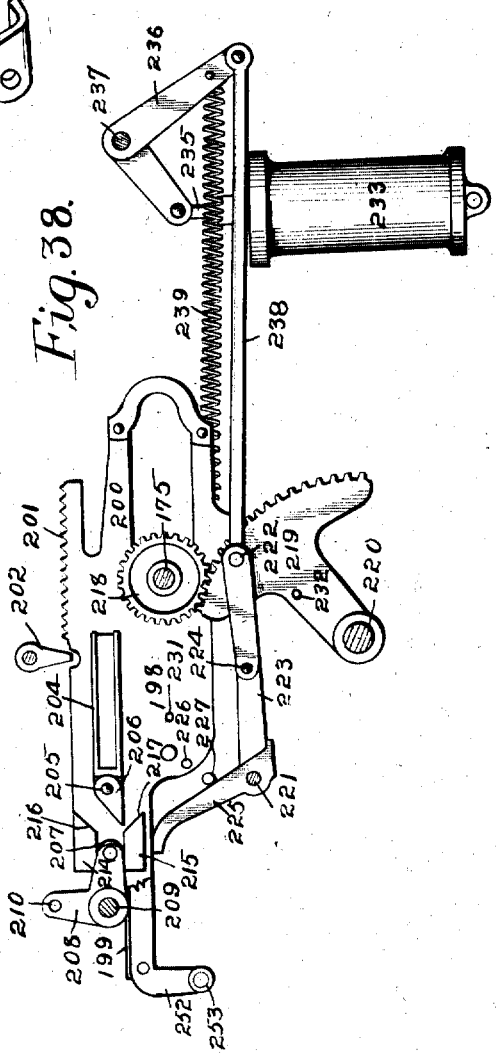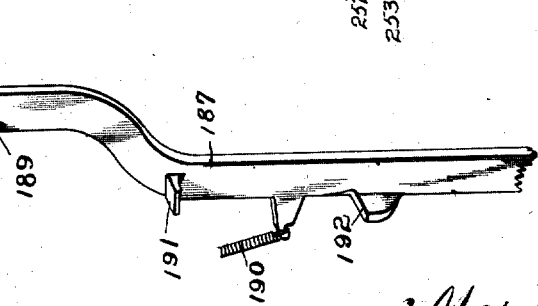

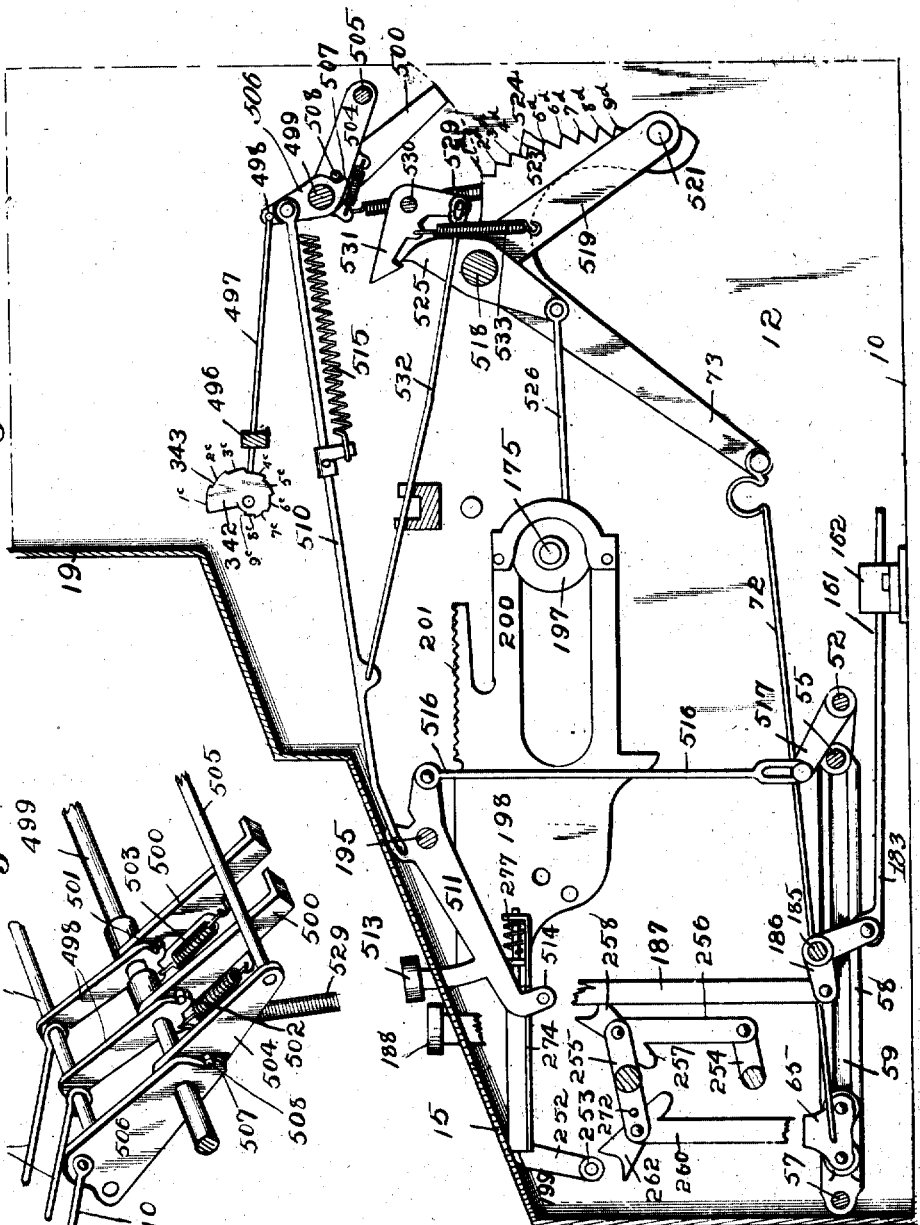

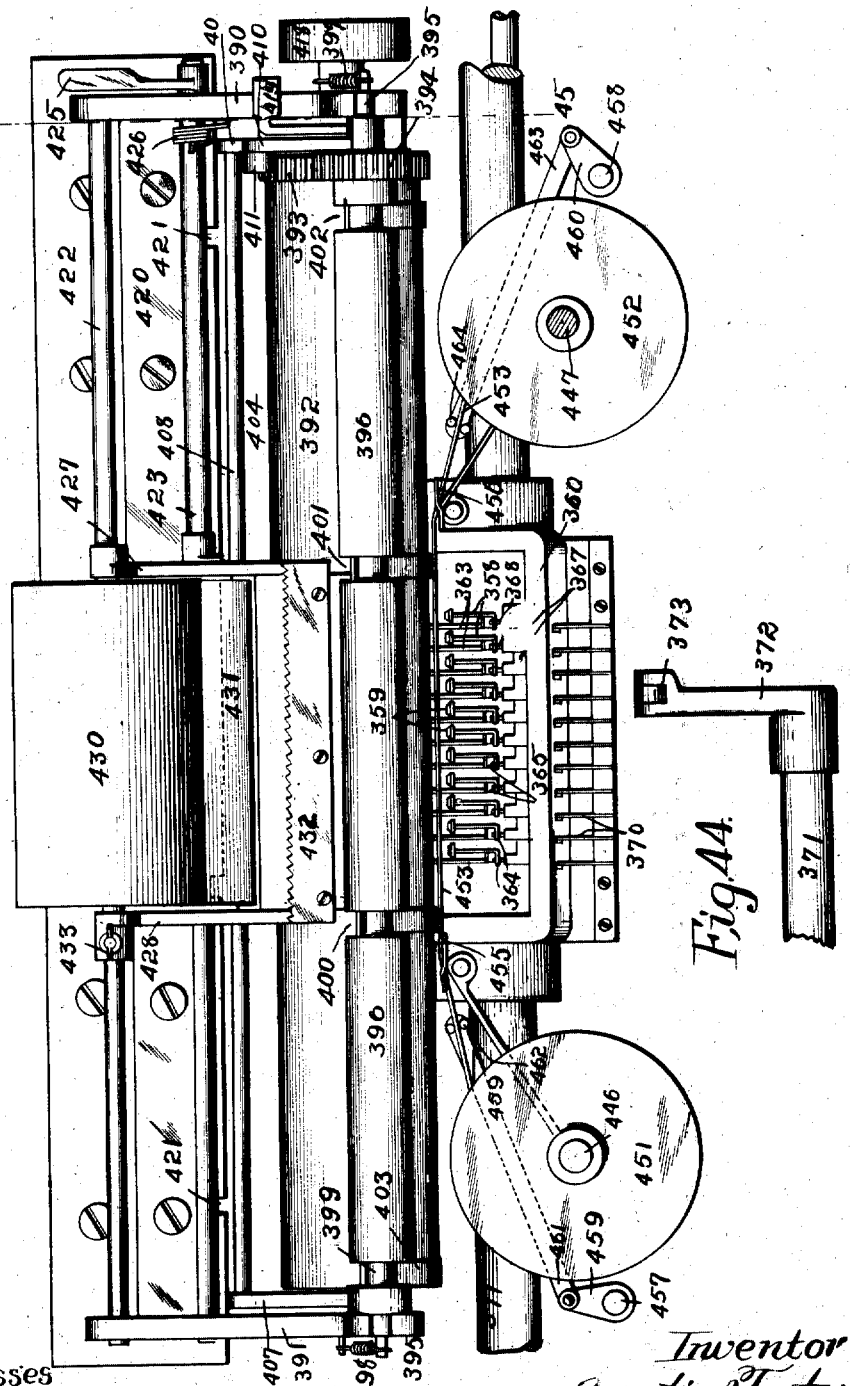

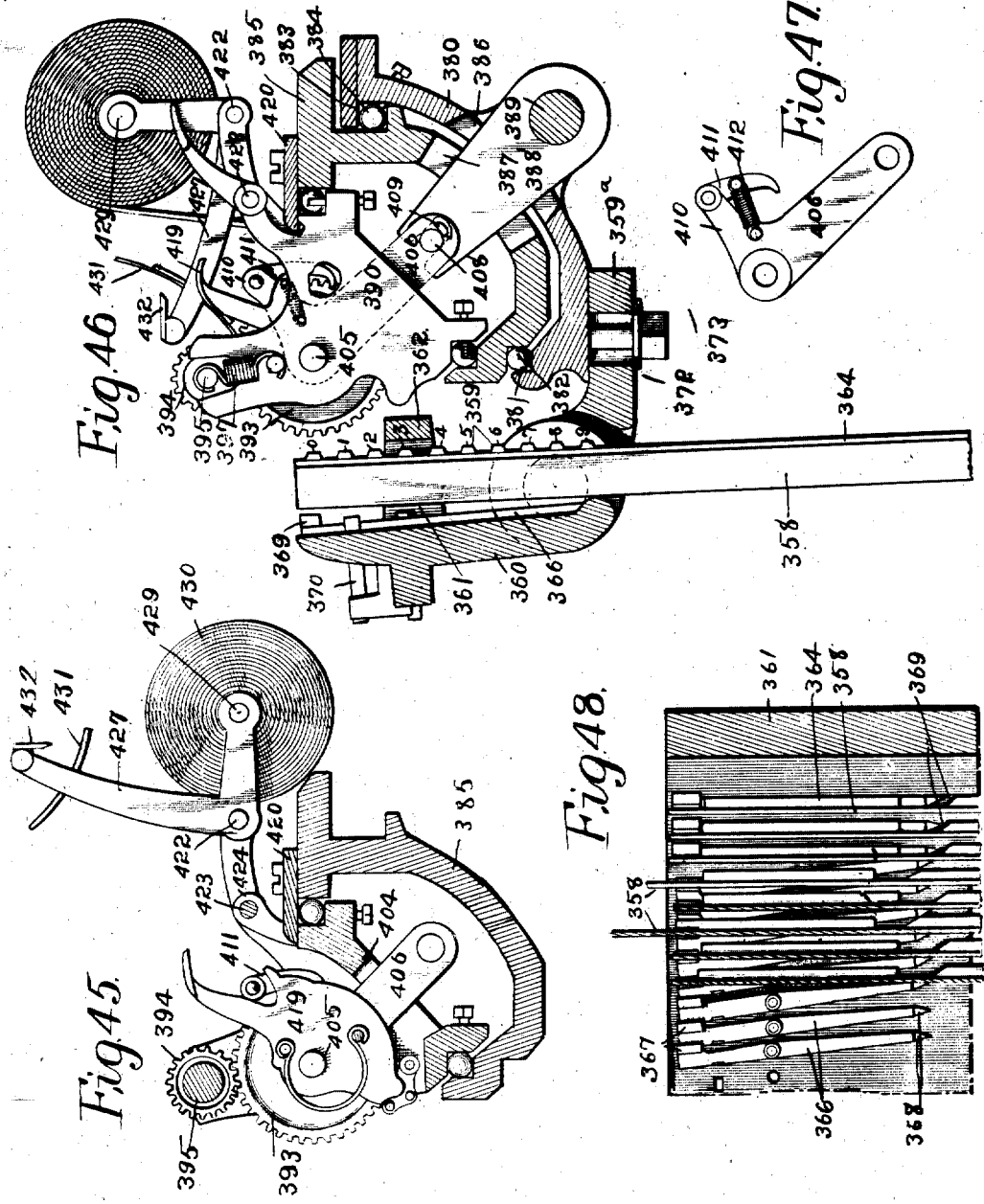

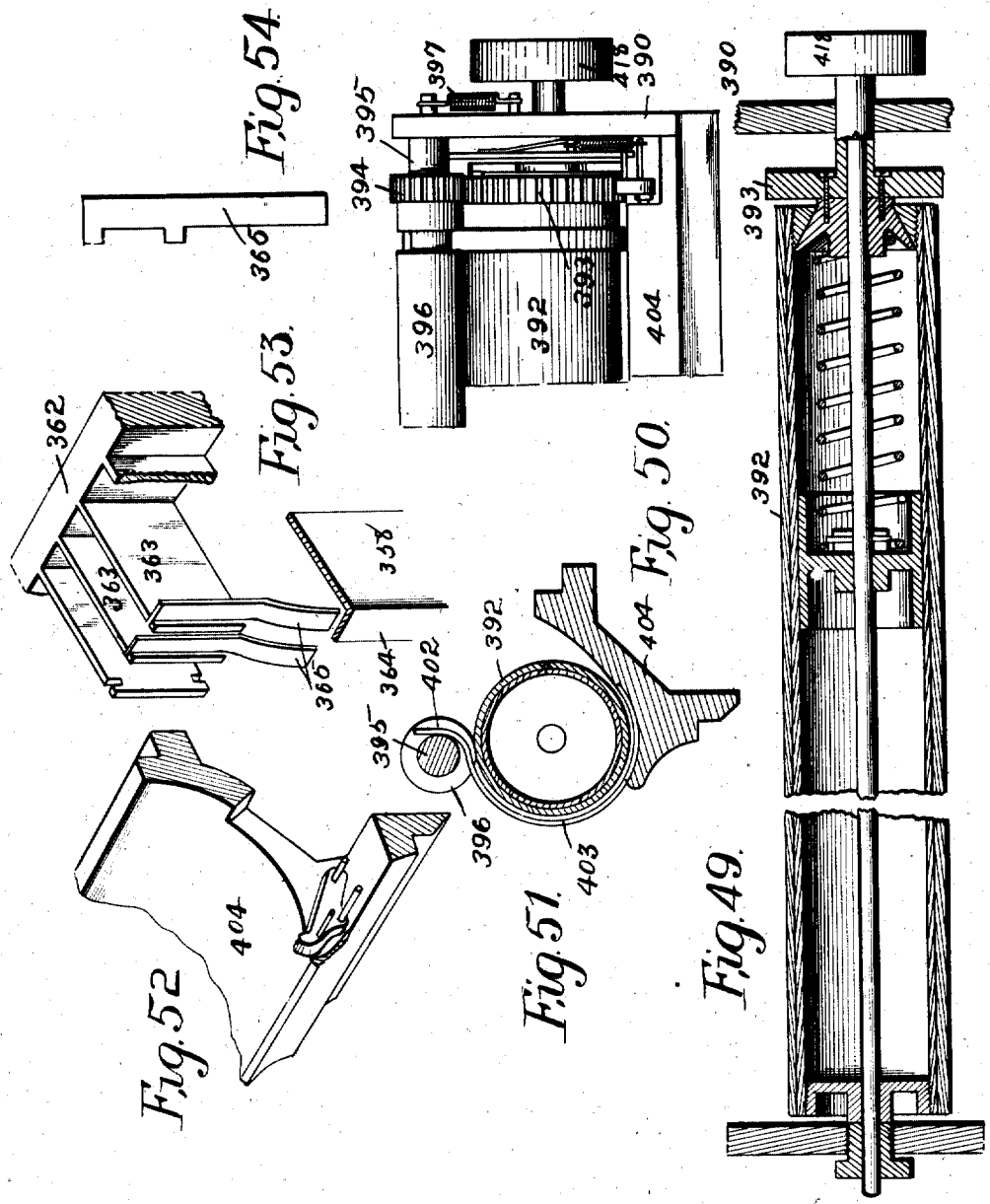

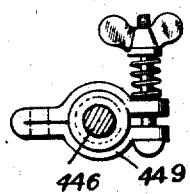
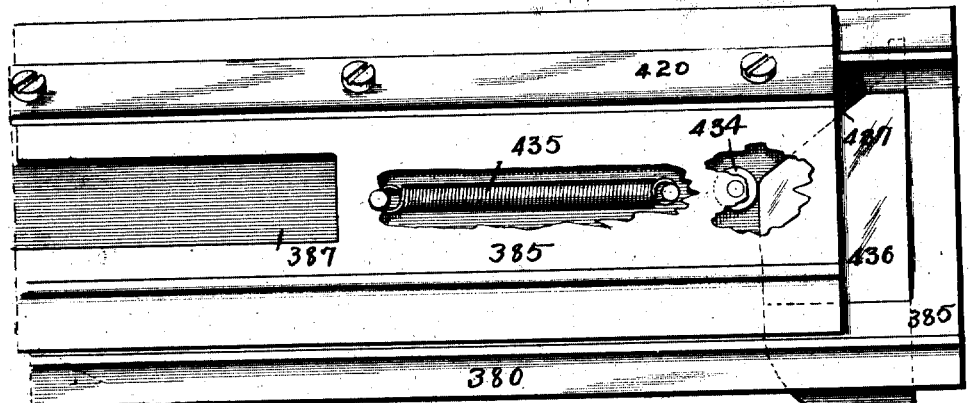
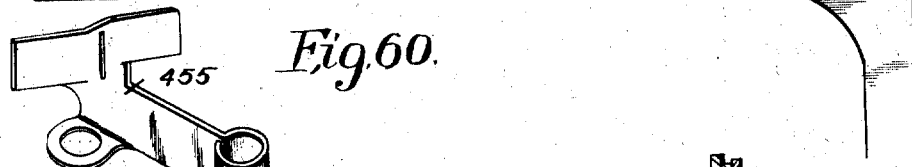
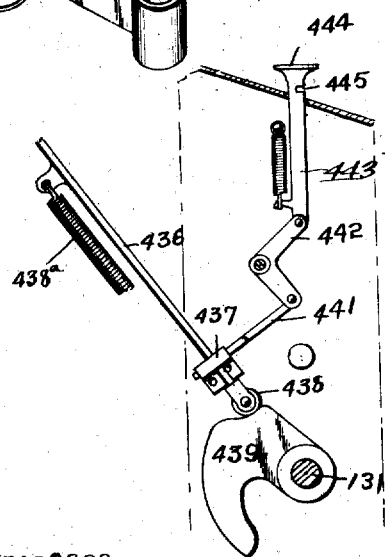
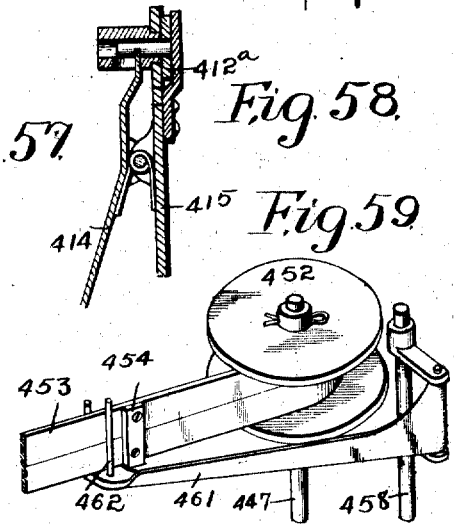

M. TEETOR.
CALCULATING MACHINE.
APPLICATION FILED APR. 20, 1908.
1,252,738.
Patented Jan. 8, 1918.
19 SHEETS—SHEET 18.
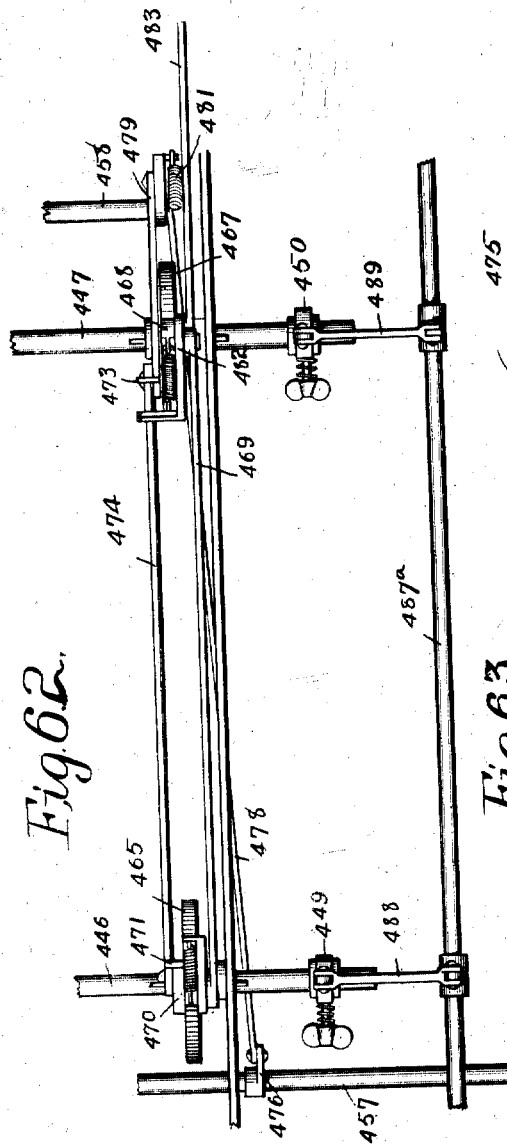
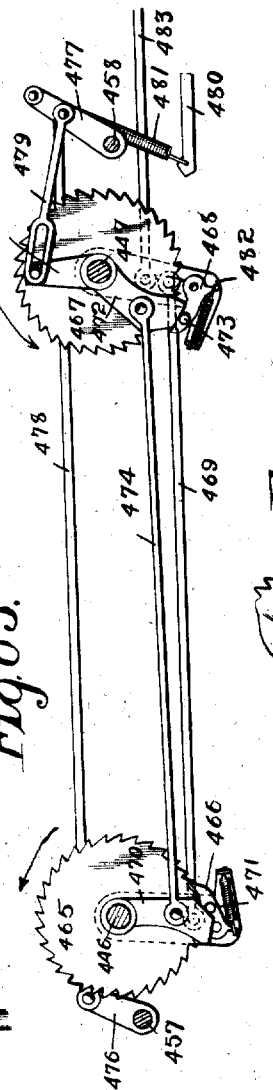
Witnesses
A. G. Hague
F. C. Dahlberg.
Inventor
Martin Teetor
by Orwig & Lane Attys

M. TEETOR.
CALCULATING MACHINE.
APPLICATION FILED APR. 20, 1908.

1,252,738.

Patented Jan. 8, 1918.
19 SHEETS—SHEET 19.

Witnesses
A. G. Hague
A. G. Thomas

Inventor
Martin Teetor
by Orwig & Lane  attys

UNITED STATES PATENT OFFICE.

MARTIN TEETOR, OF DES MOINES, IOWA, ASSIGNOR TO TEETOR COMPANY, OF DES MOINES, IOWA, A CORPORATION OF IOWA.

CALCULATING-MACHINE.

1,252,738.

Specification of Letters Patent.

Patented Jan. 8, 1918.

Application filed April 20, 1908. Serial No. 427,999.

*To all whom it may concern:*

Be it known that I, MARTIN TEETOR, a citizen of the United States, residing at Des Moines, in the county of Polk and State of Iowa, have invented a certain new and useful Calculating-Machine, of which the following is a specification.

My invention relates more particularly to that class of calculating machines designed to perform the functions of adding, subtracting, and tabulating numbers, in which the scope of the machine is practically unlimited, and in which nearly all of the driving movements of the device are controlled by positive driving mechanisms.

It is my purpose to provide a machine for commercial use comparatively simple, and so constructed that the most complicated parts of the device may be removed in sections so that if one of these sections gets out of order, another one may be readily substituted therefor and the machine kept in use while the part affected is being repaired, and further to control by positive mechanisms the various parts of the device during their operation so that there will be no likelihood of the more delicate parts being broken by the manipulation of the machine.

*The objects.*

The objects of my invention are to provide a commercial calculating machine having in its construction mechanisms of the simplest character possible, so adapted and arranged as to be automatically operated and controlled through the movement of either the adding or subtracting levers after the keys have thrown these parts into position where the operation desired is attained, and further to so simplify the mechanical construction of this class of machines as to make them more durable, require a minimum amount of adjustment and repair, and render them less liable to get out of order, thereby eliminating, to a large extent, mistakes in their work, and providing for the ready correction of any mistakes that may be made, as well as to keep them out of the repair shop by so arranging the parts that they may be more readily understood by the ordinary user of the machine, thus enabling the machine to stand commercial usage, and at the same time be rapid, accurate and positive in the various movements necessary for adding, subtracting and listing either collectively or separately.

A further object is to provide a series of rows of keys, each row running longitudinally of the machine and arranged parallel with each other for convenience in operation.

A further object is to provide a safety device which will prevent the operation of two keys at the same time in a single row of keys, and will also prevent a second key being set after one key has been set in that row, and thus eliminate complications in the adding mechanisms, thereby obviating errors of the calculating mechanisms as well as the danger of breakage of these parts.

A further object is to provide a mechanism for operating the calculating wheels, which mechanism is driven by pin connections, to provide a positive drive not dependent upon springs.

A further object is to provide a mechanism for positively returning the keys to their normal position, aside from the spring actuated mechanisms which ordinarily return these keys, thus securing a more perfect and positive operation of the parts.

A further object is to provide a single rock shaft upon which all of the pin retaining bars are mounted, and upon which all of these parts are adapted to swing simultaneously as the operating levers are manipulated.

A further object is to provide a safety lock for preventing any of the parts of the machine from being operated if any given key has been accidentally or otherwise moved to a partially set position; that is, if any given key is moved to a partially set position, my safety lock device prevents the adding or subtracting levers, which control the operation of the calculating mechanism, from being manipulated.

A further object is to provide means for regulating the speed of the operative parts of the device, regardless of the rapidity with which the operating levers are manipulated.

A further object is to provide means operated by the totaling button for locking the keys in their upper limits of movement while the totals are being taken and printed.

A further object is to provide a series of calculating sections in the machine substantially in line with each row of keys, so constructed, arranged and mounted relative to each other that each section may be removed from the machine separately and apart from the other sections, enabling the operator to remove readily and without the use of tools, these calculating sections which form the most delicate portions of the machine, and are the most likely to get out of order, and to substitute for them similar sections and proceed with the use of the machine without material disadvantage, and further to so construct each of these calculating sections that they may be entirely taken apart and disassembled without the removal of any screws or use of any tools.

A further object is to provide means for rotating the calculating wheel in either direction and make possible the operation of adding and subtracting by means of a single mechanism operating on this wheel in both directions, and also to provide a single mechanism for carrying the amounts added to the next column whether added to or subtracted from the amount listed.

A further object is to provide a lever for adding and a second lever for subtracting, which operate through the single mechanism referred to for rotating the calculating wheel in opposite directions, and further to provide a locking device for holding in its normal position the lever which is not being manipulated.

A further object is to provide means for completing the action of each part of the device after each manipulation of the operating levers by providing safety mechanisms which prevent the return of the parts to their normal position until these parts have performed their full function.

A further object is to provide a calculating machine in which the parts are normally held in position for rotating the calculating wheel so that it will add, and further to provide means automatically operated by the subtracting lever for throwing these parts out of their normal position, and allowing the calculating wheel to be rotated in a direction for subtracting.

A further object is to provide a mechanism for holding the rack, which operates the calculating wheel, out of operative relation with this wheel so that it will neither add nor subtract when thus held, and will enable the operator to use the machine as a tabulator.

A further object of my invention is to construct a machine which will both add and subtract, and in which corrections can be made in the work performed by the machine by subtracting the amount accidentally added, and then adding the correct amount afterward, or in the event the machine is subtracting, it will enable the operator to add the amount accidentally subtracted and then subtract the correct amount afterward.

A further object is to provide means in the machine whereby the carrying device is operated from the adding or subtracting levers without the pressure or use of any keys in the key-board, and further a mechanism is provided for returning in a positive manner the carrying mechanisms to a normal position.

A further object is to provide a printing mechanism which is operated through a portion of the same mechanism that performs the adding or subtracting in the device, and which completes its operation simultaneously with the adding and subtracting mechanism. Such printing mechanism is designed to be operated either in connection with or separate from the adding or subtracting mechanism. Furthermore, the printing mechanism is so constructed and arranged that it is adapted, by simply adding parts to it, for use in a machine of any desired capacity or scope.

A further object is to so arrange the mechanisms which operate the carriage of the printing device that this carriage will automatically shift whenever the subtracting lever is manipulated, and cause the amount subtracted to be listed in a column at one side of the column being added, and further to so construct the printing portion of the machine that the numbers being subtracted on account of mistakes or otherwise, may be listed in a different color from the numbers added, and to provide an automatic return of the ribbon when unwound from one of its carrying rollers.

A further object is to provide a total key which automatically sets into operation mechanisms for operating the keys which will cause the printing device to print the correct total of all addition and subtraction operations performed prior to the totaling by the machine upon the operation of the adding lever. When this total has been taken, the machine may be readily cleared of the numbers added or subtracted by the operation of the subtracting lever when the total button is in a set position.

Various other objects are apparent from the construction shown in the drawings, some of which will be specifically set out in the description hereinafter, but these are too numerous to set out specifically under the general heading of objects on account of the complexities of a machine of this class.

*General plan of the machine.*

My invention relates particularly to a calculating machine which may be varied in construction to accomplish the various objects set out, and numerous others, such is using various parts of the machine an adding, subtracting, printing, listing and tabulating in all classes of calculating, recording and registering machines. The keyboard of the machine is composed of a series of vertical rows marked with numbers running in consecutive order from 1 to 9, commencing at the lowermost key and ending with the uppermost key in each section. In the particular machine shown in the drawings, there are eleven of these vertical rows of keys, which rows are substantially parallel with each other. The keys of each row control corresponding mechanisms where parts are duplicated throughout the entire operative parts of the machine.

Each key in the key-board operates a pin connecting mechanism which acts upon the parts of a calculating section and causes the calculating wheel of the section, corresponding to that in which the key is found, to be actuated a certain number of points either forwardly or rearwardly if the adding or subtracting lever is operated. This action, however, is controlled by speed regulating mechanism which provides for the safety of the operative parts of the device, regardless of the rapidity of the manipulation of the adding and subtracting lever.

There is provided in the machine a carrying mechanism which is operated simultaneously with the operation of the calculating wheel for carrying over during addition and subtraction, as is customary in various adding machines. The operation of each key is protected against accident to the operative parts of the device by safety locking mechanisms which control the action of the keys, and the action of the levers at the proper time, and to insure the machine against damaging results by incompetent handling.

In connection with the various constructions of each section, the simplest mechanisms possible have been used to insure the correct action of the machine, and at the same time provide for the ready repair of any parts which may get out of order.

A printing device is provided which may be used independently from, or simultaneously with the calculating mechanisms by the operation of a single key in the key-board which is designed to control and lock out of operation this calculating device when the machine is used for printing.

A separate key is provided on the key-board aside from the one for controlling the printing roller, which effects the listing of the total of the amount added or subtracted into the machine by causing the automatic printing of the total when this key is depressed by the operation of the adding lever.

A key is also provided on the key-board for causing the printing mechanism to print in two colors if desired, and a key is also provided for causing the return of keys which have been depressed if it is desired not to add into the machine numbers which have been indicated by these partially depressed keys. A repeating button is also provided on the key-board for causing the machine to duplicate any number which has just been listed.

The general scope of the machine is to add, subtract and list with the mechanisms of the general scope referred to.

My invention consists in certain details, in the construction, arrangement and combination of the various parts of the device, whereby the objects contemplated are attained, as hereinafter more fully set forth, pointed out in my claims and illustrated in the accompanying drawings, in which—

Figure 1 is a side elevation of my calculating machine with the right side removed, and the printing device cut away. The shafts mounted in the right side plate are shown in section.

Fig. 2 is a longitudinal, sectional view of the device with the printing mechanism cut away, taken on the line 2—2 of Fig. 3, looking toward the left side of the machine.

Fig. 3 is an end elevation with the rear end removed, and a portion of the printing device cut away.

Fig. 4 is a sectional view of the device cut on the line 2—2 of Fig. 3, looking toward the right side of the machine.

Fig. 5 is a side elevation of the machine with the top portion cut away to show the printing mechanism, looking at the right side of the machine.

Fig. 6 is a side elevation of one of the key sections, designed to particularly show one of the locking and releasing mechanisms for the key.

Fig. 7 is an end elevation of one of the pin bearing sections with a portion cut away, and shown in section to show the relative portions of the pins in operation.

Fig. 8 is a vertical, sectional view of the device shown in Fig. 7, taken on the line 8—8 of Fig. 7.

Fig. 9 is a side elevation of one of the key sections with some of the shafts removed, and is designed to show the lock out mechanisms for holding one of the keys set and preventing the others from being operated when said key is set.

Fig. 10 is a detail view of one of the key operated bars, showing the manner in which it operates the pin operating shafts, and the operation of a portion of the totaling device.

Fig. 11 is a detail view of the lower end of one of the key operated bars, showing the way of mounting the same.

Fig. 12 is an end elevation of one of the key operated bars.

Fig. 13 is a detail, perspective view of one of the traveling members for operating one of the key operated bars and taking the total.

Fig. 14 is a sectional view taken on the line 14—14 of Fig. 9.

Fig. 15 is a detail plan view of a portion of the frame in which the upper portion of the key operated bars are mounted.

Fig. 16 is a detail perspective view of one of the catches for holding the key operated bar in a set position.

Fig. 17 is an elevation of one of the key locking dogs, shown clearly in Fig. 9, for maintaining the keys in a normal position after one has been set in any given section.

Fig. 18 is a detail plan view of a portion of one of the supporting bars for the frame of each key section, showing the rod by which these frames are removably attached to the supporting bar.

Fig. 19 is a detail view, showing the returning bar for throwing the zero pin back to normal position, and the lower portion of the frame in which it is mounted.

Fig. 20 is a detail elevation of one of the calculating sections (shown clearly in side elevation in Fig. 2) and the calculating wheel, together with the rack which operates said wheel for adding and subtracting, looking toward the left side of this calculating section, with the parts in a normal position.

Fig. 21 is an elevation of the calculating section with the side removed, looking toward the right side of said section.

Fig. 22 is a detail view of the retaining and carrying rack forming a part of the carrying mechanism.

Fig. 23 is a detail view of a portion of the left side of one of the calculating sections, showing in dotted lines the connecting rod between the calculating mechanism, and the calculating rack, and particularly the way of removing the same.

Fig. 24 is a perspective view of one of the calculating sections and the left side of the section adjacent thereto.

Fig. 25 is a detail view of the interior of one of the calculating sections, looking toward the left side of said section with the parts in operative position. This view is the same as Fig. 20, save that the parts are in an operative position instead of a normal position.

Fig. 26 is a detail view of the plates in which the retaining and carrying rack is mounted, looking toward the right side of the machine and the plates removed from their supports.

Fig. 27 is a plan view of two of the calculating sections, and the corresponding number of calculating racks.

Fig. 28 is a detail elevation of the pin bearing frame, and the main shaft with the crank for connecting the main shaft with the operative parts of the pin bearing frame.

Fig. 29 is a detail sectional view of the main driving shaft with the cog and advancing mechanism connected therewith for driving the shaft.

Fig. 30 is a detail elevation of a portion of the main driving shaft, showing the position of the gear illustrated in Fig. 29, and the crank in the shaft for operating the pin bearing frame.

Fig. 31 is a detail view of the locking mechanism operated through the total key for maintaining the upper portion of the key stems at their upper limits of movement as the totals are being taken.

Fig. 32 is a top view of the mechanism shown in Fig. 31.

Fig. 33 is a side elevation of the master plate, referred to hereinafter.

Fig. 34 shows, in elevation, a portion of the main driving shaft, and the adding and subtracting cam mounted thereon with the parts adjacent thereto for controlling the operation of these cams.

Fig. 35 is a side elevation, looking at the interior of the adding cam.

Fig. 36 is a detail elevation of the mechanism which operates the cam shifting lever, shown in Fig. 34 for operating the subtracting and adding cams.

Fig. 37 is a detail view, showing the mechanism for returning the keys, and a locking mechanism for retaining the totaling button in position for taking the total.

Fig. 38 is a detail elevation of the master-plate, and the mechanism for releasing the dash-pot at the proper time for controlling the action of various parts of the machine.

Fig. 39 is a detail elevation of the master plate showing a locking mechanism for retaining the master-plate in position until the dash-pot has completed a portion of its function.

Fig. 40 is a detail view of the totaling key, showing a portion of the key stem.

Fig. 41 is a perspective view of a releasing lever used for breaking the toggle joint in the controlling mechanism, shown in Fig. 38.

Fig. 42 is a sectional view of the machine, showing a large portion of the total taking mechanism, and a portion of the printing mechanism.

Fig. 43 is a plan view of the carriage and a portion of the printing mechanism.

Fig. 44 is a detail view of the rock arm for pressing the type through the type bars into engagement with the printing roller.

Fig. 45 is a sectional view of the printing carriage and paper holding mechanism, taken on the line 45—45 of Fig. 43.

Fig. 46 is a sectional view of the printing mechanism, showing in end elevation the carriage, and in elevation one of the type bars.

Fig. 47 is a detail view of the pawl and pawl bearing arm for operating the platen.

Fig. 48 is a detail view, showing the mechanism by which the pressure devices for forcing the type into printing position are held out of contact with the zero type in all figures to the left of those being used in totaling, as well as in retaining these zero types in this position and listing.

Fig. 49 is a sectional view of the platen.

Fig. 50 is a detail view of one end of the platen, showing the mechanism by which it is driven.

Fig. 51 is a detail, sectional view of the platen, showing the paper guide adjacent thereto.

Figure 52 is a detail portion of a section of the frame, showing in perspective the dog for holding the platen against rearward movement.

Fig. 53 is a spring supporting frame, the springs in which are designed to retain the type out of engagement with the platen.

Fig. 54 is a detail elevation of one of the springs shown in Fig. 53.

Fig. 55 is a plan view of a portion of the printing frame, showing the cam connection for operating the lower carriage, which carriage is operated from the subtracting lever to enable the amount subtracted to be listed in a separate column.

Fig. 56 (on the same sheet as Fig. 5) shows the lower end of a roller bearing rod which throws the column shifting device for listing the subtracted numbers in a separate column out of operation, and the cam for accomplishing this result.

Fig. 57 is a detail view of the rod referred to in Fig. 56, and shows the key for operating the cam, referred to therein, for shifting the lower end of the roller bearing rod.

Fig. 58 is a detail, sectional view of the locking mechanism by which the stroke of the mechanism advancing the platen may be regulated.

Fig. 59 shows one of the rolls upon which the ribbon is wound, and a portion of the mechanism for reversing the winding of the ribbon upon the roll when it has been unwound.

Fig. 60 is a detail, perspective view of one of the ribbon guides.

Fig. 61 is a detail view of a tension device for regulating the speed of the ribbon roll.

Fig. 62 is a side elevation of a portion of the driving mechanism by which the ribbon rolls are operated.

Fig. 63 is a plan view of the device shown in Fig. 62.

Fig. 64 is a detail view of a portion of one of the driving ratchets which operate the ribbon rolls, showing the way in which these ratchets are secured to the shafts upon which they are mounted.

Fig. 65 is a detail, perspective view of a portion of the total-taking mechanism.

Figure 66:
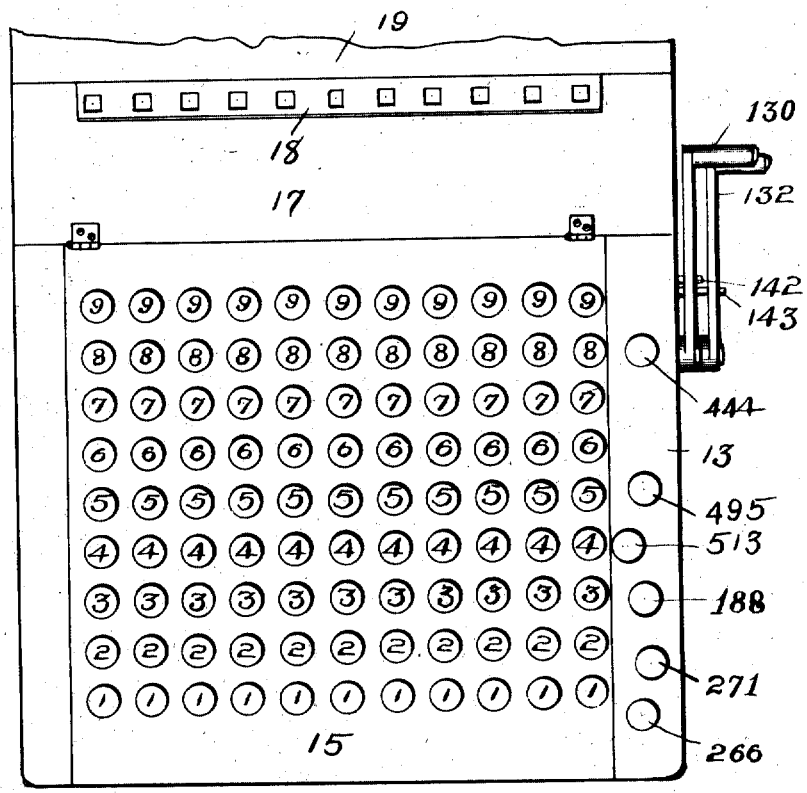
Fig. 66 is a top plan view of the key-board, the section of the machine casing to the rear of the key-board being broken away.

The frame of the machine.

The frame of the machine consists of a bottom portion 10, of a back portion 11, two end portions 12 and 13, a lower front portion 14, and a key plate 15 hinged to the front portion 14 by means of the hinge 16. Hinged to the key plate 15 is the middle front portion 17, having a glass 18 mounted midway between its upper and lower extremities, so that the numerals on the calculating machine may be readily visible from the exterior. The purpose of hinging the middle front portion 17 is to enable this to be swung over, and easy access had to the calculating portion of the machine, to remove it or adjust its parts. I have provided an upper front portion 19 which extends to the top of the machine.

Key controlling mechanism.

The key-board of the machine, mounted in the key-plate, has in it a series of vertical rows of keys, the keys in which range in numerals from 1 to 9, commencing at the bottom. There are in the machine, shown in the drawings, eleven of these rows of keys. The action of each key in a given row of keys on the parts which it controls is similar to the action of the same key in any other of the rows, and for that reason a description of one of the rows of keys makes a description of the series of rows individually unnecessary.

The corresponding parts operated by these keys in each row are similar to the parts thus operated by similar keys in any of the other rows, and the action of the subtracting and adding levers is the same on these parts in all of the rows, as well as the action of the other parts of the machine; so that save for the parts of the machine which are not duplicated, a description of one of the series of parts applies to all equally well.

The keys referred to in any given section, as shown clearly in Fig. 2, I have numbered consecutively from the lowermost one to the uppermost one with the figures 1, 2, 3, 4, 5, 6, 7, 8 and 9. These keys are preferably indicated on their upper faces by numbers corresponding to the numbers by which they are referred to herein.

Rigidly secured to these keys and extending downwardly from each of them is a key stem, each of which has a projection 20 thereon. This projection is designed to be engaged by a member, hereinafter mentioned, for retaining the keys at their upper limits of movement during the taking of totals.

Mounted immediately beneath the key-plate 15 is an auxiliary key guide 21 with openings extending through it in line with similar openings in the key-plate 15. This key-plate and key guide are designed to maintain the key stems in a vertical position throughout their movement.

Slidingly mounted on the key guide, and adjacent to the series of key stems is a locking plate 22, having shoulders formed therein for limiting the downward movement of the keys when in engagement with the projections 20, and so constructed that when the keys are at their upper limits of movement, and the slide is operated in the manner hereinafter stated, by the totaling button, the keys will be retained at their upper limits of movement. This locking plate is best shown in Figs. 2 and 6 of the drawings.

Detachably mounted in the machine beneath the key guide 21 is a supporting frame 23, having its upper portion substantially parallel with the key-plate and its lower portion parallel with the bottom 10. The lower front corner of the key-frame is supported by bars which are set in notches 23' in a bar 23² attached to the front of the machine. The key-frame is held in place by rod 23³ (see Fig. 18).

In the top portion 24 of this key frame there is a series of slots 25 as shown in Fig. 15, and in the bottom portion 26 of the frame 23 is a series of slots 27, as shown in Fig. 14. Parallel with each other, and mounted in the slots of the upper and lower portion of the frame 23 is a series of key operated bars 28, the upper ends of which are designed to engage the lower ends of the key stems of the keys 1 to 9. In other words, the lower ends of the key stems rest on top of the bars 28, whereby the bars are free to move downwardly, independently of the key stem, and yet will be depressed by each of the key stems as the keys are moved downwardly, if the bars 28 are at their upper limits of movement.

As seen in Fig. 10, each of the keys operated bars 28 has in it a curved cam groove 29 for actuating the pin operating crank shafts 30, hereinafter referred to. I have provided a cam projection 31, designed to engage the crank shaft 32 for withdrawing the zero pin simultaneously with the setting of another pin by means of the crank shaft 30. On the opposite side of each of the bars 28 from that upon which the cam projection 31 is formed, I have provided a projection 33 formed by curling up a portion of the side of the metal in the bar 28, and forming an opening 34 in said metal, as shown in Figs. 10 and 11.

Extending transversely of each frame 23 is a brace 35 connecting the front and rear ends of this frame. Pivotally attached to one side of the brace 35 and between the key operated bars 28 is a series of lock dogs 36 (see Fig. 9), on the lower end of each of which there are two projections 37 and 38, designed to be substantially in line with the openings 34 in the key operated bar 28 (see Fig. 10). When one of the keys is depressed, the corresponding bar will be pushed downwardly, and cause the projection 33 to engage the projections 37 and 38 on the locking dogs 36, and force these apart, causing the projections on the dogs to the right and left of the bar 28, which has thus been depressed, to simultaneously enter the opening 34 and retain these bars 28 in a locked position, thus preventing the keys from being operated, after one key has been partially or fully depressed. This will be seen by examining Fig. 9, where the key 6 has been depressed, the other keys being locked by this means at their upper limits of movement.

Pivoted to the upper portion 24 of the frame 23 is a series of key retaining catches 39 which are between the series of bars 28, and adjacent thereto (see Figs. 9 and 16). Near the lower portion of these key holding catches is a lug 40 designed to engage the side of the bar 28 adjacent to it, when the key is in its normal position, and so arranged that each will engage the shoulders 41 in the bar 28 adjacent to it when depressed, for retaining the bar at its lower limit of movement, and prevent the key from being returned until this key retaining catch is released. These catches 39 have a hook 42 secured near their pivotal point of attachment, as shown clearly in Figs. 9 and 16. There is a similar hook 43 on each of the bars 28.

Connecting the hooks 42 and 43 is a spring 44 designed to serve the double purpose of normally retaining the bars and keys at their upper limits of movement as well as to draw the key retaining catches into their locking position when the keys are depressed, as shown clearly in Fig. 9.

On the rear side of each of the catches 39 is a lug 45, which extends through openings 46 in the brace 47 near the top of each frame 23. These lugs are designed to be engaged by a slidably mounted catch releasing member 48 (shown in Fig. 6) which is on the opposite side of the brace 47 from the catches 39. There is a pin 49 in the rear end of the catch releasing member 48 which enters a cam groove 50 in a vertically mounted operating bar 51 which is moved upwardly by the positive mechanism to be hereinafter described, for returning the bars 28, and with them the keys of the machine to their normal position, and supplement the action of the springs 44.

Extending transversely of the lower portion of the machine (see Fig. 3) is a rock shaft 52 having connected with it, by means of two rock arms 53 and 54, a swinging shaft 55. Extending transversely of the machine, pivotally mounted in the sides thereof, and near the front end of it, is a crank shaft 56, the crank portion of which I have numbered 57, as shown in Figs. 1 and 2.

Pivotally attached to the crank 57 and the shaft 55 is a series of longitudinal bars 58, having a channel 59 in each of them. The rock shaft 52 is operatively connected with other parts of the machine which are connected with the operating lever and is actuated by it to swing the bar 58 upwardly by means of the arms 53, and the crank shaft 57 in such a way that the upper surface of this bar 58 engages the lower extremities of the operating bars 51, and moves them upwardly, whereupon the catches 39, which hold the bars 28 downwardly, are released and these bars and the catches 39 returned to their normal position by the springs 44. If, however, any of these springs 44 fail to act, the upper portions of the bars 58 engage the lower portions of the bars 28 and return the keys to their normal position by positive action. In order to have both ends of the bar 58 work simultaneously, I have provided an arm 60 on the rock shaft 52, and an arm 61 on the shaft 56, each of which is pivotally attached to a connecting rod 62, as shown in Fig. 2. Thus it will be seen that as the rock shaft 56 is operated, the rock shaft 52 will be simultaneously operated with it for raising and lowering the bar 58.

Mounted between the pieces of metal on the bar 58, which forms the channel 59, are the grooved rollers 63 and 64 connected with each other by a carriage 65, having an upright 66 thereon extending upwardly from its central portion. The upper end of this upright 66 is bent into the form of a loop 67 to receive the vertically movable hook 68, as best shown in Fig. 13.

There is an opening extending through the carriage 65 for receiving the lower end of the body of the hook, so as to maintain it in its vertical movement. There is a limiting stop 69 in the body of the hook, designed to be engaged by a spring 70 which passes around the body of the hook, and engages the loop 67 for normally maintaining this hook at its lower limit of movement for exerting a yielding pressure on the hook, and allowing it to engage a hooked portion 71 on the lower end of each of the key operated bars 28, even though these bars may be out of line somewhat. This carriage and its parts are well illustrated in Figs. 2 and 13, and the whole mechanism is termed a traveling carriage for the sake of convenience.

This traveling carriage is designed to be operated through a rod 72 which is pivotally connected with it, and with an operating lever 73 in the totaling mechanism. It will, of course, be understood that there is a traveling carriage for each row of keys. These traveling carriages are so constructed and arranged that when the total button is depressed they will be moved adjacent to the key operated bars 28 which represent the parts corresponding with the total calculated into the machine by its previous operations. The hooks 68 of each traveling carriage will engage the hook 71 of the associated bars 28, and upon the operation of the adding lever, with the totaling button depressed, these traveling carriages will draw the bars 28 downwardly and automatically set them to correspond to the numbers in the total in the machine, thereby causing the total to be printed by the printing mechanism.

Extending transversely of the lower portion of the machine is a shaft 74 having an arm 75 at each end thereof, between which arms there is a slotted bar 76, as shown in Fig. 4. The shaft 74 has mounted on it an arm 77, to which is pivotally attached the rod 78, connected with a pivotally mounted locking lever 79, hereinafter referred to in connection with the other operations of the device.

Slidably mounted in the lower portion of each frame 23 is a safety lock bar 80 (see Figs. 9, 10, 11 and 14), having a series of slots 81 in one edge of it, so arranged that the projection 82 on the key operated bar 28 is allowed to move vertically through these slots in the ordinary operation of the machine, and the safety lock bars 80 are allowed to move horizontally above and below said projection when the keys are not depressed at all, or are fully depressed. When, however, one of these key operated bars 28 has been partially depressed and is in that position, the machine is locked out of operation, owing to the fact that the metal at the side of one of the slots 81 in the safety lock bar 80 engages the projection 82. This action is brought about by the operation of the shaft 74, as there is a hook 83 on the forward end of the bar 80, which enters the slot in the slotted member 76, causing the bar 80 to follow the movement of said slotted bar 76 when not in engagement with the projection 82.

The use of these safety locks and locking mechanisms for the key operated bars referred to obviates, to a large extent, the danger of the machine getting out of repair and mistakes being made in the operation through use by an inexperienced operator.

Extending vertically of each frame 23 is a series of bearing bars 84 parallel with each other, and adjacent to each key operated bar 28, as shown in Figs. 2, 6, 9 and 10. In each of the bars 84 there is a bearing 85, and extending through the back portion of the supporting frame 23 is a series of bearings 86. Each of the bearings 86 is in line with a bearing 85 in the bars 84.

Mounted in the bearings 85 and 86 is a series of pin operating crank shafts 30, hereinbefore referred to, and shown clearly in Fig. 2, each having a crank 88 on its forward end, which crank enters the cam grooves 29 (see Fig. 10) in the key operated bar 28, so that as the keys are depressed, the crank shafts 30 will be rocked slightly. On the rear end of each of these crank shafts 30 I have provided a pin operating member 89, shown clearly in Figs. 2 and 9, designed to enter an annular groove 90 (see Fig. 7) in the pins 91 of the pin controlled mechanism for setting and withdrawing these pins.

Beneath the series of crank shafts 30 is the crank shaft 32, referred to heretofore, one of which is mounted in and extends longitudinally of each frame 23. The bearings of this shaft are in the rear and forward end portions of the frame 23. This is shown clearly in Fig. 2. This crank shaft 32 has a pin operating member 92 designed to engage an annular groove 93 (see Fig. 7) in the zero pin 94 for withdrawing this zero pin as one of the other pins is set, and for setting this pin, as one of said pins 91 is withdrawn. This crank shaft and its pin operating member 92 are operated simultaneously with the depression of any key, owing to the fact that the cam projection 31 on the key operated bar 28, engages this crank shaft as said bar is moved downwardly. Each of the crank shafts 32 is returned to its upward or normal limit of movement by means of an operating bar 95 pivotally attached to the bar 58, as this bar is operated, (shown in Figs. 2 and 19.)

Extending transversely of the machine and rotatably mounted in the sides 12 and 13 is a rock shaft 96, (shown in Figs. 3, 7 and 8,) having a series of pronged pin bearing frames 97 in the prongs 98 and 99, of which the series of pins 91 are slidably mounted, and the channels 90 in these pins are between the prongs, so that they may be engaged by the pin operating members 89 on the rear end of each of the crank shafts 30.

Slidably mounted in the prong 98 is a pin locking member 100, having a series of notches in its edge, as clearly shown in Fig. 8. To the upper end of this member the lever 101 is connected by means of the pivot 102 which bears a roller 103. The lever 101 is connected to the upper end of the prong 98 by means of the pin 104. The end of the lever 101 opposite from that to which the roller 103 is secured, has, attached to it, a spring 105, the lower end of which spring is secured to the prong 98 by means of a hook 106. There is a releasing bar 107 extending across the machine and mounted in the sides of it, which engages the roller 103 and normally holds it, together with the locking bar 100, at its lower limit of movement, leaving the pins 91 in position for being operated. In that portion of each pin which is in the prong 98 I have provided an annular groove 108 designed to come in line with the pin locking member 100 when the pins are in their normal position, as shown in Figs. 7 and 8.

When the pin bearing frame is swung by the rock shaft 96, the roller 103 is drawn out of engagement with the releasing pin 107, and the spring 105 allowed to act to raise the pin locking member 100 and retain the pins in the positions in which they have been set prior to the rocking of the crank shaft 96, by the projections 109 entering the grooves 108 in the pins which have not been moved, and passing behind the pins which are set by the operation of the key. In order to make the foregoing clear, I have given an additional number to the pins to show their relation to keys above referred to. The lowermost pin I have numbered $0^a$, and the pins above it in consecutive order from the lowermost $1^a$, $2^a$, $3^a$, $4^a$, $5^a$, $6^a$, $7^a$, $8^a$, and $9^a$. From this numbering and lettering, it will be observed that the keys which operate the pins bear each a number corresponding to that representing the corresponding pin.

Mounted on the outside of the prong 99 of each of the pin bearing frames 97, and having its outer surface in engagement with the prong 98 of the next adjacent pin bearing frame, by which it is held against lateral movement, is a pin controlled swinging member 110 having a series of openings 111 in it which, for the sake of convenience, I have additionally indicated in consecutive order from the bottom $0^b$, $1^b$, $2^b$, $3^b$, $4^b$, $5^b$, $6^b$, $7^b$, $8^b$, and $9^b$, to show that the pins corresponding in numbers enter these openings when they are operated by the proper keys. There is a small end 112 on each pin (see Fig. 7) designed to enter the openings 111 while the larger portions of the pin engage the inner surface of the swinging member 110 and prevent further movement of the pin.

The zero pin 94 is in line with the center of the bearing 113 of the rock shaft 96, so that whenever the pin bearing frame is operated, and the zero pin 94 is in the opening $0^b$, there will be no swinging movement of the plate 110, the sole purpose of the zero pin being to normally hold the swinging member 110 in position relative to the pin bearing frame 97 when none of the other pins have been set.

Each of the pin controlled swinging members 110 has an outwardly extending arm 114 which is pivotally attached at its outer end to the lower arm of the bell crank lever 115, mounted on a bearing shaft 116, as shown in Fig. 2. The upper arm of the bell crank lever 115 is pivotally connected with a calculating rack bar 117, the teeth in which are so spaced apart as to mesh with a calculating wheel 118 (see Figs. 2, 20 and 27) having ten teeth in its periphery, and as the rack is elevated the distance of one tooth, the wheel will be rotated one-tenth of one complete revolution, and a corresponding distance for each additional raising of the rack.

In order to understand thoroughly the operation of these parts, I have used the following illustration. Assuming that the key 9 is depressed, and with it the key operated bar 28 immediately beneath it, the cam 29 will cause the associated crank shaft to be rotated slightly, and the pin 9ª will be forced by the pin operating member 89, which enters the channel 90, into the opening 9ᵇ in the pin controlling swinging member 110, at the same time the cam projection 31 on the key operated bar 28 will engage the rock shaft 32 and cause the pin operating member 92 on said rock shaft to withdraw the zero pin 94 from its normal position in the opening 0ᵇ in the pin controlled swinging member 110. When this key 9 is at the lower limit of movement and the pin 9ª is set and the zero pin withdrawn, as indicated, the key operated bar is retained at its lower limit of movement by the retaining catch 39, and the other keys are held out of operation by the key locking dogs 36. The operating lever, hereinafter referred to, is then operated to swing the crank shaft 96 and, simultaneously therewith the pin carrying frame 97 and the pin controlled swinging member 110, which latter member swings on the pin 9ª as a pivot, as shown in Fig. 1, to draw downwardly the calculating rack 117 for advancing the calculating wheel nine points. Thus the amount indicated on the key is transferred to the calculating wheel. When the operation is completed, the pin carrying mechanism is returned to its normal position through the parts hereinafter described.

Extending transversely of the machine and above the upper arm of the bell crank lever 115 is a shaft 119, adjacent to the ends of which I have mounted the arms 120 and 121, between the free ends of which there is mounted the shaft 122, as shown in Figs. 1 and 2. Pivotally mounted on the shaft 122, between the arms 120 and 121 is a series of pivotally mounted guide plates 123, each of which has a slotted member 124 (see Figs. 20 and 23) at its upper end through which one of the rack bars 117 passes; that is, there is one of these pivotally mounted guides for each of the rack bars 117, and as the shaft 119 is rocked, the rack bars are moved into or out of mesh with the adjacent calculating wheel 118.

Secured to the shaft 119 is an operating arm 125 (see Fig. 3) which has on its free end two rollers 126 and 127 (see Fig. 3) which are designed to be engaged by the calculating cam 128 (see Figs. 34 and 35), hereinafter referred to. As this cam is operated, the shaft 119 is rocked to bring about the result of shifting the calculating rack 117 into and out of mesh with the calculating wheel 118.

Rotatably mounted in a bearing in the side 13 (that is the right side of the frame) is the short adding shaft 129 having rigidly secured to its outer end and outside of the frame, the adding lever 130 (see Figs. 3 and 5.)

Rotatably mounted in the frame 13 a short distance beneath the shaft 129 is the short subtracting shaft 131 having rigidly secured to its outer end, outside of the frame the subtracting lever 132 which is outside of the adding lever a slight distance, so that they will not conflict in operation.

Secured to the inner end of the adding shaft 129 is a lever 133 (see Fig. 4) which is operatively connected at its upper end with the master-plate, to be hereinafter described. Secured to the inner end of the subtracting shaft 131 is a lever 134 (see Fig. 4) which is operatively connected at its upper end to the master-plate just referred to.

Secured to the adding shaft 129 immediately outside of the lever 133, is a cam 135 having a projection 136 at its lower rear extremity, as shown in Fig. 4. Secured to the shaft 131 and immediately outside of the lever 134 is a cam 137 having a projection 138 on its upper forward extremity. Connecting an eye 139 on the cam 135 with an eye 140 on the cam 137 (see Fig. 4) is a contractile coil spring 141 which serves the purpose of returning either the adding or subtracting shafts 129 and 131, together with the parts connected with them, back to a normal position after they have performed their functions.

As shown in Figs. 3 and 5, there is a pin 142 extending outwardly from the side 13 for limiting the rearward movement of the adding lever 130 and a pin 143 extending outwardly from the side 13 for limiting the rearward movement of the subtracting lever 132.

The parts just mentioned, in connection with the adding and subtracting lever, are not duplicated throughout the machine, as one of each of these parts is all that is necessary for performing their respective functions.

Extending inwardly from the side 13 and in front and slightly above the subtracting shaft is a shaft 144 (see Fig. 4) having a bell crank lever 145 thereon, on the rear end of one arm of which I have provided a roller 146, and on the lower end of the other arm of which I have provided a roller 147. Pivotally attached to the upper forward arm of the bell crank lever 145 is a slidingly mounted link 148 having a roller 149 at its upper end, so arranged as to pass either above or below a plate 150 on the masterplate, hereinafter referred to.

Mounted on the fixed shaft 151, which is secured to the side 13 of the frame is a bell crank lever having the two arms 152 and 153 thereon, as shown in Fig. 4. There is an angular depression 154 in the rear upper portion of the arm 152 designed to receive the roller 147 on the lower arm of the bell crank lever 145.

Pivotally attached to the lower end of the arm 153 of the bell crank lever mounted on the shaft 151 is a rod 155 which has a hook 156 at its forward end. This rod passes through a lug 157 which is secured to the arm 75, which operates the safety lock bar 80 and is mounted on the shaft 74.

There is a spring 158 on the rod 155 designed to engage the lug 157, so that when the rear end of the arm 152 of the bell crank lever is moved downwardly, and the lower end of the arm 153 is moved forwardly, this spring will rock the upper end of the arm 75 and draw the safety lock bar 80 forwardly, provided it is free to operate. If, however, it is not free to operate on account of one of the keys being partially depressed, the spring will not prevent the slight operation of the adding or subtracting lever, and thus there will be no breaking of the parts due to this operation.

I have provided a spring 159 which is connected at its upper end to the brace 160 secured to the side 13, and at its lower end to the arm 152 for normally maintaining this arm in contact with the roller 147, as shown clearly in Fig. 4.

By the arrangement of the parts thus described, the bell crank lever 145 is normally maintained in the position shown in Fig. 4. When the adding lever is operated by drawing it forwardly, the projection 136 on the cam 135 engages the roller 146 and forces this roller into the cam 137, locking the subtracting lever out of operation. This simultaneously forces the arm 152 downwardly for accomplishing the results above stated. When, however, the adding lever is released, it will be forced to its normal position, as shown in Fig. 5, and these parts just referred to will assume their normal position.

When the subtracting lever is operated, the projection 138 on the cam 137 will engage the roller 146 and force the roller upwardly, and rock the bell crank lever 145, throwing the roller into engagement with the cam 135, and locking it and the adding lever out of operation. The other parts are operated in the same manner as above indicated.

When the adding lever is operated, the link 148 is moved downwardly so that the roller 149 engages the under surface of the bar 150 to lock the bell crank lever 145 at its lower limit of movement during the operation of the master-plate, at the completion of which operation it automatically releases itself.

When the subtracting lever is operated, the link 148 is moved upwardly so that the roller 149 engages the upper surface of the plate 150 and normally locks the bell crank lever 145 in the proper position throughout the entire operation of the master-plate, at the completion of which operation, these parts are automatically released, and are forced back to their normal position on account of the inclined edge of the angular notch 154, and the action of the spring 159.

To the lower end of the lever 134 I have pivoted an operating slide bar 161 (see Figs. 1 and 4) which extends rearwardly to a guide block 162, having a slotted opening 163 extending longitudinally of it, as shown in Fig. 36. The rear end of the operating slide bar is inclined at 164 to engage a roller 165 at the left end of the slide bar 166 which extends transversely of the bottom of the machine toward the left side.

Pivotally connected to the left end of the slide bar 166 is a rock arm 167 (see Fig. 36), which rock arm is secured at its other end to the cam controlling rock shaft 168. This rock shaft has its bearings 169 and 170 in the bottom 10, and on the side 12 of the frame, as shown in Fig. 2. There is a spring 171 for normally holding the slide bar 166 in engagement with the slide bar 161 at all times, and also holding the shaft 168 and the parts connected with it in a normal position.

Rigidly secured to the shaft 168 is a shifting lever 172 (see Figs. 2 and 34), having the forked rear end 173 thereon, in each prong of which there is a slot 174 as best shown in Fig. 34.

Extending transversely of the central portion of the machine, and mounted in the sides 12 and 13 is a main driving shaft 175, near the left end of which the cam 128 is mounted, as shown in Figs. 2 and 34. This cam is capable of a slight longitudinal adjustment owing to the fact that it is feathered to the shaft 175, as shown clearly in Fig. 34. On the inner end of the cam bearing 176 I have rotatably mounted a collar 177, to which the prongs 173 of the cam shifting lever are connected by means of pins 178 entering the slots 174, thus allowing for the cam 128 to be rotated with the main driving shaft 175, and at the same time shifted longitudinally of this shaft in certain of the operations.

On the bearing of the cam 128 I have provided an adding flange 179 and a subtracting flange 180, which are spaced apart a slight distance. In the inner face of the adding flange there is a cam groove 181. In the face of the flange 180 adjacent to the flange 179 there is a cam groove 182.

The operating arm 125, which throws the calculating rack bar 117 into or out of mesh with the calculating wheel 118 (as previously explained) has its free end between the flanges 179 and 180 of the cam 128, and it is held in such position that the rollers 126 and 127 will enter the cam grooves 182 and 181 respectively, as the cam 128 is shifted. The roller 127, however, is normally in the cam groove 181, as this is the adding flange and it is the one that is normally used the greater part of the time. When, however, the subtracting lever is manipulated, the lower end of the lever 134 moves the slide bar 161 rearwardly, and this causes the slide bar 166 to move transversely of the machine for moving the cam shifting lever in such a way that the cam 128 will be shifted toward the left side of the machine, and the roller 126 will enter the cam groove 182, and out of the adding flange 179 for performing the subtracting function. The cam 181 is so arranged that as the main driving shaft is operated, the calculating rack bar 117 will be thrown into engagement with the calculating wheel 118 when this rack is at its lower limit of movement, so that the calculating wheel will be rotated for adding on the up stroke of the calculating rack bar 117, and this rack bar will be thrown out of engagement with the calculating wheel 118 on the down stroke of said calculating rack bar.

When the cam 128 has been shifted from the subtracting lever, so that the roller 126 enters the subtracting cam groove 182, the calculating rack bar 117 will be thrown into mesh with the calculating wheel 118 when this rack bar is at its upper limit of movement, and the calculating wheel will be rotated on the down stroke of the rack bar, and the rack bar will be thrown out of engagement with this calculating wheel on the up stroke of said rack. Thus the rotation of the calculating wheel is reversed by the adding and subtracting flanges 179 and 180 through the operation of the adding and subtracting levers.

Substantially parallel with the sliding bar 161 is a similar sliding bar 183, the rear end of which extends through the slot 163, and the guide 162, and has an inclined forward end 184 of substantially one-half the height of the inclined portion 164 of the bar 161. This inclined end engages the roller 165 as it is forced forwardly and moves the bar 166, and with it the shaft 168, and the cam shifting lever 172, and the cam 128 to position where the rollers 126 and 127 will be at a neutral position between the adding and subtracting flanges, and out of the cam groove 181 and 182; that is, in the position shown in Fig. 34, thus holding the rack 117 out of mesh with the calculating wheel 118 throughout the entire operation of the machine when the operating bar 125 is in this position. The roller 165 in this latter instance rests upon the top of the bar 183.

Pivotally connected with the forward end of the bar 183 is a bell crank 185, which is mounted on the stub shaft 186, attached to the right side of the machine, and in front of the shaft 131, as shown in Figs. 1, 4 and 42. The forward end of this lever is pivoted to a key stem 187, to the upper end of which is attached the printing key 188. There is a notch 189 in this printing key designed to lock the key down in position for printing when the metal forming the lower portion of this notch engages the keyboard.

It will be thus seen that when this key is locked down, the operative parts of the device are allowed to be manipulated without affecting in any way the action of any of the calculating wheels 118. There is but one of these printing keys, and the parts connected with it are not duplicated.

There is a spring 190 connected with the key stem 187 and the side 13 of the frame for returning the key to its normal or upper limit of movement.

On the key stem 187 there is a lug 191 which is engaged by the totaling lever, hereinafter described, for depressing the printing key and throwing it into printing position at the time the total is taken. There is also a lug 192 extending laterally from the key stem 187, and below the point of attachment of the spring 190 to this key stem, designed to be engaged by the pin on the master-plate for automatically releasing this key and allowing it to be returned by the spring 190 to its normal position. A detail view of the printing key is shown in Fig. 40.

"*The master-plate.*"

Extending transversely of the machine and adjacent to the printing lever is a grooved roller bearing shaft 193 having a grooved roller 194 thereon. Extending transversely of the machine and above, and at the rear of the shaft 193 is a grooved roller bearing shaft 195, having the grooved roller 196 thereon. Mounted on the main driving shaft 175 is a grooved roller 197. The grooved rollers 194 and 197 are substantially in line with each other, as shown in Fig. 4.

Mounted on the rollers 194 and 197, and in engagement with the grooved roller 196, is the master-plate 198 having at its forward end an arm 199 which moves longitudinally on the grooved roller 194, and at its rear end a two part guide 200 engaging the upper and lower portions of the grooved roller 197, so that the master-plate will be kept from vertical movement in its horizontal action at the rear end. The upper portion of the master-plate engages the lower portion of the grooved roller 196, so that the forward end is held against upward movement as it is moved horizontally. This master-plate, of which there is but one used in the machine, is adjacent to the right side of the machine, and a large part of all of the operations of the machine are performed through this plate. Figs. 33, 38 and 39 show detailed views of the master-plate. There is a toothed surface 201 in the upper rear edge of the master-plate designed to be engaged by a locking dog 202 which permits the master-plate to move forwardly, but prevents its rearward movement until a complete stroke of said master-plate has been taken. At the outer end of the arm 199 is a pin 203 which is designed to be engaged by the extreme rear end of the safety lock 79, after the master-plate has been moved a slight distance, which pin and lock together prevent the operation of the master-plate 198, and of the adding and subtracting levers, until these levers are allowed to be thrown over by the release of this safety latch through the cams 135 or 137. The purpose of this latch and pin is to prevent the operation of the master-plate, and of the subtracting and adding levers, provided anyone of the keys in the key-board is partially depressed, and it enables the operator to ascertain that there are incomplete operations in the machine, and allows him to remedy these prior to his putting the operative parts of the device into operation. As soon as the partially depressed key has been righted, either the cam 135 or 137, depending upon whether the adding or subtracting lever is operated, operates to raise the free end of the safety lock 79 out of contact with the pin 203, and allows the master-plate to continue its forward movement. This pin 203, and the safety lock 79, with its operative parts, are best shown in Fig. 4.

Mounted on the right side of the master-plate 198 and near the top portion thereof, is a channeled two-faced track 204, the faces of which are on the upper and lower portion thereof. Secured to the stub shaft 205, which extends through the master-plate 198 in front of the track 204, is a substantially V-shaped switch 206, designed to be normally held with its pointed end at its lower limit of movement, as shown in Figs. 38 and 39, which is its position in the adding operation to receive a roller 207 on the rear end of the bell crank lever 208, which is mounted on the shaft 209. The upper forward end of the bell crank lever is pivoted at 210 to a connecting rod 211, which is connected with an arm 212 secured to a crank shaft 213 (see Fig. 1), adjacent to the calculating mechanism and mounted in the sides of the machine. As the roller 207 moves upwardly over the switch 206 and the track 204, while the master-plate is moved forwardly, the rod 211 is drawn forwardly, and places the adding spring in the calculating mechanism, hereinafter referred to, under tension. When the switch 206 is turned to its upper limit of movement automatically by the subtracting lever, through a mechanism hereinafter referred to, and the master-plate is moved forwardly, the roller 207 passes beneath the switch 206 and engages the lower face of the track 204, causing the rod 211 to be moved rearwardly for rocking the crank shaft in that direction, and placing the subtracting spring in the calculating mechanism, hereinafter referred to, under tension.

Referring to Figs. 38 and 39, there are two blocks 214 and 215, having inclined rear ends 216 and 217 mounted on the forward end of the right side of the master-plate 198, between which the roller 207 on the bell crank lever 208 stands when the master-plate is in a normal position. When the master-plate is being returned from its extreme limit of movement, and the roller 207 engages either the upper or lower surface of the track 204, either the inclined end 216 or 217 engages said roller, and draws the bell crank lever 208, and the parts connected with it, back to their normal position.

Mounted on the shaft 175 and adjacent to the right side of the master-plate 198 is a gear 218 which is in mesh with a rack sector 219, mounted on the stub shaft 220, which is secured to the side 13 of the frame. Mounted on the side plate 13 and in front of the rack sector 219 is a pin 221, and mounted on the rack sector 219 is a pin 222. Pivotally attached at its outer ends to the pins 221 and 222 is a toggle 223 whose central pivot 224 is substantially mid-way between its ends. Pivotally mounted in the pin 221 is a toggle releasing lever 225, shown clearly in Figs. 38 and 41, which is designed to be engaged by a pin 226 on the right side of the master-plate 198 for swinging the upper end of the toggle forwardly when said pin engages it and breaks the point of the toggle releasing it, and allows the rack sector to be operated at the proper time. There is a pin 227 in the side 13 of the frame, designed to be engaged by the toggle releasing lever 225 when at its upper limit of movement, and thus maintain the toggles in their normal and properly locked position.

Pivotally attached at one end to the forward central portion of the right side of the master-plate and secured at its rear end to a rotatable shaft 228, is a two link toggle 229 pivoted at its central portion. Secured to the shaft 228, which is rotatably mounted in the side 13, is a releasing lever 230. This toggle is designed to have its parts most nearly together when the toggle 223 is extended; that is, when the master-plate is at its normal position.

As the master-plate approaches its forward limit of movement, this toggle 229 extends simultaneously with the falling of the toggle 223, and when the master-plate reaches its extreme forward position, the toggle 229 is fully extended, and engages the pin 231 on the master-plate 198 and locks the master-plate against rearward movement until the releasing lever 230 is engaged by a pin 232 on the rack sector 219. The purpose of this toggle locking device 229 is to retain the master-plate at its forward limit of movement until the action of the other parts of the device has been completed. When this toggle is released, the master-plate is allowed to be withdrawn to its point of starting by the mechanism hereinafter described.

"*Speed regulating mechanism.*"

Pivotally mounted in the extreme rear lower portion of the frame of the machine and adjacent to the side 13 thereof, is a dash-pot 233 (see Figs. 1 and 38) having a piston head 234 slidingly mounted therein, to which is secured a piston rod 235 for the bell crank lever 236, which bell crank lever is mounted on the stub shaft 237, which is secured to the side 13 of the frame. The lower end of the bell crank lever has pivotally attached to it a connecting rod 238. This connecting rod 238 is attached at its forward end to the pin 222 on the rack sector 219.

Connecting the lower portion of the bell crank lever 236 with the lower rear end of the master-plate 198 is a spring 239 designed to be placed under tension as the master-plate is moved to its forward limit of movement. As this master-plate is moved forwardly, the toggle 223 is released, and the spring 239 acting on the bell crank lever 236, will draw the piston in the dash-pot 233 to its upper limit of movement gradually; that is to say, the piston in the dash-pot will regulate the speed of the operative parts of the mechanism which are operated by the rack sector 219 after the spring 239 has been placed under tension, regardless of the speed at which the subtracting or adding lever is operated, thus providing a safety device for preventing the delicate parts of the device being operated at too rapid a rate of speed. Connected with the rear end of the master-plate and with the back portion 11 of the frame is a spring 240 for drawing the master-plate to its rearward limit of movement as soon as the point of the toggle 229 has been released from its locked position.

The speed of the rearward movement of the master-plate is regulated also by the dash-pot through the mechanism above described.

On the upper left side of the master-plate I have provided a pin 241, upon which is slidingly mounted the slotted link 242, as shown in Fig. 4. The forward end of the slotted link is pivotally connected with the lever 133 which is secured to the adding shaft 129. These parts are so arranged that as the adding lever 130 is swung forwardly, the link will draw the master-plate forwardly against the resistance of the springs 239 and 240. On the lower portion of the right side of the master-plate is a pin 243, upon which is slidingly mounted the slotted link 244, the forward end of which is connected with the lever 134, which is mounted on the subtracting shaft 131, and is so arranged that as the subtracting lever 132 is swung forwardly, the master-plate will be drawn forwardly by the link 244 against the resistance of the springs 239 and 240. Owing to the construction of these links 242 and 244, when the adding lever is moved forwardly, the subtracting lever and the slotted link 244 will remain stationary, and also when the subtracting lever is moved forwardly, the adding lever and the link 242 will remain stationary.

Pivotally connected with the upper rear end of the subtracting link 244 is a switch operating bar 245 having a pin receiving notch 246 in its forward end. This notch is designed to receive a pin on an arm 247 secured to the switch shaft 205.

Mounted on a stub shaft 248 (see Fig. 4) is a hanger 249, having a pin 250 at its lower end, designed to enter a notch 251 in the switch operating bar 245, a slight distance at the rear of the notch 246. This hanger 249 is designed to maintain the forward end of the switch operating bar 245 at its upper limit of movement when out of contact with the pin on the arm 247, as the master-plate moves forwardly from the operation of the adding lever. This causes the switch 206 to be retained at its normal position for adding, as shown in Fig. 38 when the master-plate is operated by the adding lever. When, however, the subtracting lever is used to operate the master-plate 198, the slotted link 244, operating on the switch operating bar 245, which engages the pin on the arm 247, rocks the shaft 205 and causes the switch to be thrown to its upper position on account of the slight movement of the slotted link 244 before its rear end engages the pin 243; that is, the switch is first turned, and then is retained in a position by this switch operating bar during the subtracting operation as the master plate moves simultaneously with the link 244.

Extending downwardly from the forward end of the master-plate is a roller bearing member 252, having the roller 253 in its lower end, as best shown in Figs. 38 and 39. Pivotally attached to the right side of the machine and a slight distance from the forward portion thereof are two pivotally mounted bars 254 and 255, substantially parallel with each other, as shown in Figs. 1 and 4. To the rear ends of these bars I have pivotally attached the connecting bar 256 having an extension 257 on its forward side. Pivotally attached to the pivotal connection between the links 255 and 256 is a dog 258 (see Fig. 4) held in position by a spring 259 to engage the roller 253, in taking the total when the master-plate is moved forwardly, and after the totaling button has been depressed.

Pivotally attached to the forward end of the bar 255 is a bar 260, which is pivotally attached at its lower end to an arm 261 on the shaft 56. There is a dog 262 pivotally attached to the upper end of the bar 260, having a rounded outer end. There is a spring 263 connected with an extension of the bar 260 at one end, and at its other end to the rear of the dog 262, designed to hold the dog normally in position for receiving the roller 253 on the forward end of the master-plate as this master-plate is returned to its rearward limit of movement, the said roller having first passed over the end of the dog 262 by depressing said dog against the resistance of the spring 263.

As the master-plate is being returned and the dog 262 is engaged to force the bar 260 downwardly, the arm 261 causes the shaft 56 to be rotated, and the bars 58 to be moved upwardly to engage the bar 51 and release the key catches 39 to supplement the action of the springs 44 and return the keys to their extreme upper limits of movement.

There is a spring 264 connected with the bar 260, and the side 13 for automatically returning the bar 260 and the parts operatively connected with it, to a normal position after the roller 253 has left its engagement with either the dog 262 or 258.

Slidingly mounted in the forward right hand portion of the key-board is a key stem 265 having a repeating key 266 at its upper end. There is a lug 267 on the key stem 265 designed to engage a pin 267' on the dog 262 when this key is depressed, so that the roller 253 will not act on the dog 262. This causes the keys which have been depressed to be retained in that position during repeated operations of the adding or subtracting levers, and hence add into the machine for any number of times desired, a given number which is repeated in the addition or subtraction.

The repeating button 266 is retained at its lower limit of movement by a catch 268 which engages the key-board. When this button has been once depressed, the machine will repeat indefinitely the numbers indicated by the keys which are depressed until this button is released and forced to its upper limit of movement by the spring 269, which is connected with the key stem, and with the side 13 of the frame.

Slidingly mounted in the key-board of the machine and immediately at the rear of the repeating button, is a key stem 270 having the error key 271 at its upper end. The lower end of this key is designed to engage a pin 272 on the right side of the bar 255, which is designed to be pushed downwardly by the operator for actuating the bar 260, and the parts operatively connected with it for throwing the keys which may have been depressed by mistake, together with the other operative parts, back to their normal position. There is a spring 273 connected with the projection on the key stem 270 and with the frame of the machine for returning this to its normal position when it has been used.

On the right side of the arm 199 is a track 274 (see Fig. 37) which operates a portion of the totaling mechanism, hereinafter described. Slidingly mounted on this track 274 is a block 275 having an inclined face 276 thereon. This block is maintained at its forward limit of movement by the spring 277, as shown clearly in Fig. 37 of the drawings. This block forms a portion of the totaling mechanism, referred to. The gear 218, above referred to, is rotatably mounted on the main driving shaft 175. Rigidly secured to this shaft 175 and on the left side of the gear 218 is an arm 278 (see Figs. 29 and 30), to the upper end of which is pivoted a dog 279, which is limited in its downward movement by a pin 280 engaging the metal forming the lower end of the slot 281, in the arm 278. There is a spring 282 for normally holding this dog 279 at its lower limit of movement, which spring is secured to the pin 280 and to the arm 278.

The free end of the dog 279 is curved to receive a pin 283 extending outwardly from the gear 218. This arm 278 and dog 279 are so arranged that as the rack sector 219 swings forwardly, the dog 279 will engage the pin 283 and rotate the main driving shaft 175 for carrying out the operation of the parts connected with this driving shaft. When the rack sector 219 is operated on in its return stroke, the gear 218 rotates on the shaft 175 without operating it. At each operation of the rack sector, the gear 218 drives the main driving shaft 175 a complete revolution before the rack is allowed to return.

There is a crank 284 in the main driving shaft 175 which is operatively connected by a connecting rod 285 (see Fig. 28) with an arm 286 rigidly secured to the right end of the crank shaft 96, to which each of the pin bearing frames 97 are secured, so that as the main driving shaft is operated from either the adding or subtracting lever through the mechanism above described, the rock shaft bearing the pin frames, is operated to move the calculating rack 117 the number of points determined by the setting of the pins controlled by the keys in the key-board.

*"The calculating or carry over mechanism."*

Extending transversely of the frame and mounted in the sides 12 and 13 is a channel bar 287 having a series of eleven notches in its upper portion, each of which notches being designed to receive in it the rear lower corner of one of the eleven calculating or carry over sections which this channel bar 287 is designed to support. For the purposes of convenience I shall refer but to one section, and show its relation to the next one, as these calculating sections correspond throughout in their construction and operation. Extending longitudinally of the channel bar 287 and mounted in the channel thereof is a removable rod 288 (see Fig. 2), designed to enter a notch 289 in the lower rear corner of the sides 290 and 291 of each of the calculating sections, as shown in Fig. 24. The upper rear portion of the side plates of the calculating section has an opening 292 extending through each of them, through which a removable rod 293 is passed, supported at its end portions by a frame 294 that is secured to the sides 12 and 13 of the frame of the machine, as shown in Figs. 1 and 2. The rods 293 and 288 may be readily removed from the exterior of the machine so that each of the calculating sections may be removed from the machine independently of the rest, the remaining calculating sections being temporarily held in position by the engagement of one of its parts with the crank shaft 213. The calculating sections comprise the two side plates 290 and 291 which are connected to each other by means of the pins 295, 296 and 297, as shown in Fig. 24. Each of these pins has a semi-annular groove 298, which is outside of the side 291 when the sections are assembled. There is a locking lever 299 (see Figs. 1 and 2) pivoted at its central portion to the outside of the plate 291, and is so constructed at its end portions as to enter the semi-circular grooves 298 in the pins 295 and 296, and lock the side 291 by means of these pins to the side 290. There is a locking catch 300 pivoted to the upper rear corner of the side 291, so constructed that its lower portion will enter the semi-circular groove 298 of the pin 297 for maintaining this portion of the side 291 through the pin 297 to the side 290. By simply moving the locking lever 299 and the locking device 300 on their pivots, and out of the slots 298, the side 291 may be readily removed from the calculating section after this has been removed from the machine so that ready access may be had to the interior and operative parts of this mechanism without the use of tools, and hence the calculating section may be both removed from the machine, and disassembled without the use of tools, and very readily.

Extending transversely of the lower forward portion of each of the calculating sections is a bearing 301 having mounted on it near the plate 290 a swinging operating plate 302 (see Figs. 20, 21 and 25), having a slot 303 at its lower end designed to fit over the crank shaft 213 which is operated from the bell crank 208 by the switch 206 on the master-plate as the master-plate is moved forwardly.

Mounted on the pin 301 and adjacent to the side 291 of each of the calculating sections, are two arms 304 and 305 (see Fig. 21) which are held in their proper position relative to the operating plate 302 by means of the lugs 306 and 307 on these arms, which engage a projection 308 on said operating plate, as shown clearly in Fig. 21. The rear end of the operating plate 302 has two engaging surfaces 309 and 310 for holding a swinging plate in the calculating mechanism in the proper position.

There is a locking arm 311 on the operating plate 302 for forcing the catch 312 into a locked position relative to the swinging plate above referred to, by having its rear end enter the notch 313 in said substantially semi-circular plate, which I have numbered 314. This swinging plate is mounted on a bearing 315 at the central portion of each calculating section.

As best shown in Fig. 26, there is a channel 316 in the outer rear portion of the plate 314 in which is slidingly mounted a block 317 secured to a carrying and retaining gear segment 318, the lower end of which has a channel 319 for receiving a roller 320 mounted on the bearing 315, and which, together with the block 317, hold the carrying and retaining gear segment in sliding relation to the swinging plate 314, and enable it to be moved forwardly and rearwardly relative to said swinging plate 314. The teeth of the gear segment 318 are designed to mesh with the teeth of the calculating wheel 118. When thus in mesh, the gear segment is designed to rotate said wheel one-tenth of its complete revolution at the proper time for carrying numbers added or subtracted from one column to the next, and also for retaining the calculating wheel 118 against rotation during certain of the operations, and while the machine is not being operated.

In the outer lower periphery of the swinging plate 314 is a notch 321 designed to be engaged by a catch 322 which is pivotally secured to the rear end of each calculating section. There is a spring 323 connected with this locking catch at one end, and connected with an operating lever 324 pivotally and slidingly connected with the side plate 291 as best shown in Fig. 23. The lever 324 is also pivotally and slidingly connected with the carrying and retaining gear segment by the stud 324' thereon passing through the slot 325 in the segment, as shown in Fig. 25.

The rear end of the operating lever 324 has a hook 326, which is designed to hook over the shaft 122, connected with the arms 120, and the blocks 123 (see Fig. 2) in such a way that as the carrying rack bar 117 is swung into and out of engagement with the calculating wheel 118, the operating lever 324, and with it the gear segment 318, will be moved forwardly and rearwardly respectively, and hence the said gear segment will be thrown out of and into mesh with the calculating wheel 118.

There is a lug 327 on the operating lever 324, (shown in Fig. 2) designed to engage the upper portion of the catch 322 for holding this catch out of the notch 321 when the rack bar 117 is out of mesh with the calculating wheel 118, and when the gear segment 318 is in mesh with said calculating wheel 118. When the rack bar 117 is thrown into mesh with the calculating wheel 118, and the gear segment 318 is out of mesh with said calculating wheel, the spring 323 will cause the catch 322 to enter the notch 321 and retain the plate 314 in a fixed position.

The forward ends 328 and 329 of the plate 314 are so shaped as to be engaged by the engaging surfaces 309 and 310 of the operating plate 302 (see Fig. 20) when this operating plate is drawn back to its normal position by the return of the master-plate through the blocks 214 or 215 acting on the bell crank 208, and also to retain this swinging plate 314 against rotation until the engaging surfaces 309 and 310 are out of engagement with the forward ends 328 and 329 of the swinging plate.

Pivotally mounted on the bearing 315, and in contact with the swinging plate 314 is an auxiliary swinging plate 330 having two lugs 331 and 332 extending outwardly from it. Connecting the lug 332 with the arm 305, which is operated by the operating plate 302, is the adding spring 333. Connecting the lug 331 with the arm 304, which is operated by the operating plate 302 is the subtracting spring 334. In the outer portion of the auxiliary swinging plate 330 is a notch 335 in which operates a pin 336, secured to the swinging plate 314. This pin is of less width than the notch 335, so as to allow a certain movement of the auxiliary plate 330 when the adding or subtracting spring is under tension relative to the plate 314, before these plates act together. The auxiliary plate 330 is provided with a notch 337 which is in line with the notch 313 on the swinging plate 314 when these plates are in their normal lock position, as shown in Fig. 26. These two notches are designed to receive the end of the catch 312 simultaneously when the plate 314 and the auxiliary plate 330 are in their normal position. When the adding or subtracting spring is placed in tension, the auxiliary plate 330 is advanced the slight distance allowed by the difference in dimensions of the notch 335 and the pin 336. If the adding spring is operated, the catch 312 will be engaged by the metal forming the forward corner 341 of the notch 337, as shown in Fig. 24; if the auxiliary plate 330 is operated by the subtracting spring in the opposite direction, the catch 312 is engaged by the metal forming the rear of the notch 337. The catch 312 is raised out of the notches 313 and 337 by the action of the lever 338 in the adjacent section at the right (see Fig. 24), the roller 339 of said lever engaging the lateral projection 340 on the catch 312. This prevents the catch 312 from dropping back into the notches 313 and 337, while the catch 322 is within the catch 321. The plate 314 is thus held against rotation until it is released by the lug 327 on the operating lever 324 acting against the catch 322, at the time when the calculating rack 117 is thrown out of engagement with the calculating wheel 118.

As shown in Fig. 27, the calculating wheel, to which I have frequently referred heretofore, comprises the gear 118$^a$, and a numeral indicating wheel 118$^b$ secured to said gear, having on its periphery numbers running consecutively in order from 0 to 9 around said wheel and spaced equi-distant apart in such a way that these numbers are readily observable through the glass 18 in the front of the machine.

There is a shaft 341 in each calculating section, to which the parts 118$^a$ and 118$^b$ of the calculating wheel 118 are secured. Rigidly mounted upon the left end of this shaft is a total taking calendar 342, shown clearly in Fig. 24, comprising a segmental plate having a series of nine notches 343 in its outer edge, which for the sake of convenience, I have additionally numbered, beginning with the one farthest from the center, 1ᶜ, 2ᶜ, 3ᶜ, 4ᶜ, 5ᶜ, 6ᶜ, 7ᶜ, 8ᶜ, 9ᶜ.

Mounted on a pin on the indicating wheel 118ᵇ, and extending toward the calendar 342, is a roller 344 (see Fig. 24) designed to engage the operating lever 338 in one section, and force its rear end downwardly upon each revolution of the shaft 341 to thereby raise the catch 312 out of the notches 313 and 337 in the plates 314 and 330, respectively, of the adjacent section.

"*Operation of the calculating mechanism.*"

The purpose of the calculating mechanism is primarily to retain the wheel in position while the calculating rack bar 117 is out of mesh with said wheel, and to transfer by said calculating mechanism a number into the column at the left after the calculating wheel of a given section has been rotated a complete rotation or more when the machine is adding; and if the machine is subtracting and the particular calculating wheel 118 is rotated a complete revolution or more, the calculating wheel in the section at the left is rotated in the subtracting direction to reduce the number in that section one point through the mechanism of these sections.

Assuming that the adding operation is to take place, the calculating mechanism is in the normal position shown in Fig. 20; that is, the operating plate 302 is in engagement with the swinging plate 314, the gear segment 318 is in mesh with the calculating gear 118ᵇ, and is locked in that position by said gear segment, and other parts in operative relation to it, the rack 117 is out of mesh with the calculating wheel, and the master-plate is at its rearward limit of movement.

As the master-plate moves forwardly, the switch 206 first causes all of the operating plates 302 to be drawn forwardly at their lower ends by the shaft 213 and its connections, and the adding spring 233 in each of the calculating sections placed under tension, as shown in Fig. 25.

As soon as this operation has taken place and the master-plate continues its movement forwardly, the toggle 223 is released, and the main driving shaft allowed to operate for drawing the rack 117 into mesh with the calculating wheel 118 through the cam 128. Simultaneously with this action the gear segment 318 is forced out of mesh with the calculating gear 118 in each calculating section, and the catches 322 are allowed to enter the notches 321 in each of the swinging plates 314. The rack then continues its upward movement the number of points indicated by the key which controls its operation.

When the calculating wheel has been rotated a single revolution, the roller 344 engages the operating lever 338 and raises the catch 312 in the adjacent section to the left, and causes said catch to engage the periphery of the swinging plate 330, owing to the differences in dimensions between the slot 335 and the pin 336, as hereinbefore described. This catch is held against the outer periphery of the swinging plate 330 and the operating arm 338 is held at its upper limit of movement by a spring 345 connecting this catch 312 with the operating lever 338. This spring also serves to return this catch and lever to their normal positions.

The racks 117 then continue their upward movement until this has been completed, at which time they are forced out of engagement with the calculating wheel 118, and the gear segment 318 drawn into mesh with the gear 118ᵃ of the calculating wheel, as shown in Fig. 20, and the catch 322 drawn out of the notch 321 in the swinging plate 314 which allows the adding spring 333 to exert a pulling force on the swinging plates 330 and 314, and causes the gear segment 318 to be drawn downwardly at its rear end for advancing the calculating wheel one point in this calculating section to the left of the one first described, thus causing one additional number to be added into the section to the left of the one in which the numbers were originally added, thus carrying the numbers from one section to another upon each complete revolution of the calculating wheel.

The operation is just reversed in the subtracting operation; that is, as the parts are operated for subtracting, one number is subtracted out of the calculating mechanism at the left on each complete revolution in a subtracting direction of the calculating wheel by the action of the subtracting spring 344.

"*Gear segment returning device.*"

Rigidly secured to the shaft 119 upon which is mounted the arm 120 for throwing the rack into and out of gear, is an operating lever 346, as shown in Fig. 1. Pivotally connected with the forward end of this operating lever 346 is a spring maintained dog 347 which is pressed downwardly by a pin 348 at the rear end of the master-plate, as the master-plate moves forwardly. As the master-plate is returned, the pin 348 engages the dog during a certain portion of the stroke of the master-plate, and forces the operating lever 346 downwardly to rock the shaft 119 in such a way as to move the upper end of the lever 120 forwardly and force the calculating racks 117 into mesh with the calculating wheels 118. This causes the lever 326 to force the gear segment 118 out of mesh with the calculating wheel 118 at the time the rack 117 is forced into mesh with the calculating wheel 118. While the rack 117 holds the calculating wheel 118 in position, the adding or subtracting spring 333 or 334, depending upon which action is being performed, is by the operation of the operating plate 302 caused to force the swinging plates 314 and 330, and with them the gear segment 318 and catch 312 back to normal position. The spring 349 (see Fig. 1) then returns the calculating rack 117 back to its position, out of engagement with the calculating wheel 118, and the parts are in the position shown in Fig. 20, and ready for further operation.

"*The printing mechanism.*"

There is an arm 350 integral with each of the eleven bell crank levers 115, hereinbefore referred to, as shown in Fig. 2. Pivotally connected with the lower end of each of these arms is an operating bar 351, each of which operating bars is pivotally connected with an arm 352 as shown in Fig. 3. Each of these arms is secured to a shaft 353 extending transversely of the machine which are arranged one above the other and slightly out of vertical line, as shown in Figs. 2 and 3.

Secured to each of the shafts 353 is an operating arm 354, which operating arms are so arranged that they will be slightly out of line with each other; that is, the lowermost arm is adjacent to the right end of the shaft, and the others in consecutive order are set a little to the left of the shafts above, so that they will be free to operate.

Pivotally attached to the rear end of each of the arms 354 is a link 355 which is pivoted at its rear lower end to a bar 356. Each of these bars 356 is mounted on a shaft 357 extending transversely of the machine and near the rear upper portion thereof.

Pivotally connected to each of the links 355 is a type bar 358 having a row of type 359 on its upper end, the type of which represent the numerals 0, 1, 2, 3, 4, 5, 6, 7, 8, 9, running in consecutive order from the top to the bottom, as shown in Fig. 46.

Owing to the construction thus described, as the bell crank 115 is swung a certain distance to elevate the calculating rack bar 117, the operating bar 351 is raised a corresponding distance to raise the type bars 358 which have been set by the keys to a proper position for printing the number on said type bar corresponding to the number on the key which controls this operation.

Mounted on the upper portion of the back 11 of the frame is a support 359ª (see Fig. 46), to the outer end of which is pivotally mounted a swinging member 360 which has two bar supporting plates 361 at each end of it which extend rearwardly and between which the bars 358 are mounted.

Extending rearwardly from the bar 362 is a series of plates 363 (see Figs. 43 and 53), between which plates and through an opening in the support 359ª, the type bars 358 extend, and by which the upper ends of these type bars are supported. Each of the type bars 358 has a lateral projection 364 at its forward left side, each of which is designed to be engaged by a spring 365 secured to each of the plates 363, shown in Fig. 53. These springs are designed to normally hold the type bars 358 at their forward limit of movement out of engagement with the platen of the printing mechanism, hereinafter described, as this bar is raised and lowered.

Pivotally attached to the swinging member 360 is a series of levers 366, each having an operating block 367 at its upper end, as shown in Fig. 48. At the lower end of these levers 366 is an inclined projection 368, designed to be engaged by an inclined projection 369 on the extension 364 of the type bar 358 as this type bar is moved upwardly. This incline portion 369 is formed by cutting away a portion of the extension 364, as shown in Fig. 48.

The upper portions of these operating levers 366 are so arranged that as the upper portion of one lever 366 is swung to the right it will draw the blocks 367 of the levers at the right into line with the forward portions of all the type bars to the right. Therefore, when the swinging member 360 is swung to force the set type bar rearwardly, it will also force all the type bars to the right of the set type bar into engagement with the platen of the printing mechanism hereinafter described. The purpose of this construction is to print the "zeros" at the right of the set-up numbers without printing the "zeros" to the left. That is to say, if 100 were being added in, it would be necessary to print the two "zeros" at the right of the numeral 1, while it would be undesirable to print any zeros to the left of that number.

There is a series of springs 370 (see Figs. 43 and 46) for drawing the operating levers 366 to their normal position, so that the blocks will stand between the type bars 358, and unless the type bars have been operated upon, the numbers will not be printed, except the zeros to the right of the one in question, owing to the fact that the blocks pass between the type bars as stated.

The swinging member 360 is mounted on a shaft 371 to which there is rigidly secured an arm 372 which extends rearwardly from said shaft, as shown in Fig. 44. Pivotally attached to the rear end of this arm 372 is a link 373, to the lower end of which is pivotally attached an operating lever 374, mounted at its central portion on a stub shaft 375 secured to the side 12 of the machine, as shown in Fig. 2. The extreme forward end of this operating lever 374 has a roller 376 on it which is designed to be engaged by a projection 377 on the cam 378, which is mounted on the extreme left end of the main driving shaft 175 of the machine, so that as this cam is rotated, the forward end of the operating lever 374 is raised to draw the link 373 downwardly and swing the upper end of the swinging member 360 rearwardly for forcing the proper type bars against the printing platen, hereinafter described.

Connected to the side 12 and to the rear portion of the operating lever 374 is a spring 379 for normally returning the operating lever 374, and the parts connected with it, together with the type bar 358 to their normal position. Mounted between the sides of the frame and its rear upper portion is a curved supporting frame 380 (see Figs. 5 and 46), having a roller bearing slot 381 running longitudinally of the forward edge, and transversely of the machine with rollers 382 mounted therein. At the opposite side of the curved supporting frame 380 is a roller bearing 383 having rollers 384 mounted therein. Slidingly mounted on the rollers 382 and 384 is a curved carrier frame 385 which extends transversely of the machine. There is a slot 386 in the curved supporting frame 380 and a slot 387 in the carrier frame 385, through which slots an operating lever 388 extends which is mounted on the shaft 389 extending transversely of the machine beneath the curved supporting frame 380.

Slidingly mounted relative to the carrier frame 385 is a platen frame comprising two end portions 390 and 391 (see Fig. 43) connected together by a bottom portion 404, between which is rotatably mounted the platen 392. At the right end of the platen is a gear 393 in mesh with the gear 394 mounted on a roller shaft 395, which roller shaft is adjustably mounted in the upper portions of the ends 390 and 391 of the platen frame. Upon this shaft is mounted the roller 396 which is held in constant engagement with the platen 392 by means of the springs 397 and 398 which are secured respectively to the ends of the shaft 395 and the plates 390 and 391. It is between this roller 396 and the platen 392 that the paper is designed to pass, upon which the numbers are printed by the type bars.

The roller 396 ] is four annular grooves 399, 400, 401 and 402, in each of which there is a spring 403 (see Fig. 51) which is secured at one end to the shaft 395, and at its other end to the bottom 404 of the platen frame, and is designed to guide the paper beneath the platen 392 and around its forward side and between said platen and the roller 396 to a point of delivery.

Extending downwardly and rearwardly from the ends of the shaft 405 which supports the platen 392 are the arms 406, and 407, between the lower ends of which there is mounted a shaft 408, as shown in Fig. 43. There is a notch 409 in the upper forward end of the operating lever 388 designed to receive the shaft 408 for operating it, as shown in Fig. 43. Extending rearwardly from the arm 406 is a pawl supporting member 410 (see Fig. 47) having a pawl 411 pivotally attached to and depending therefrom, the lower end of which engages the gear 393 and is held in such engagement by the spring 412. This pawl is so arranged that as the arm 406 is rocked forwardly at its lower end, the platen is rotated to advance the paper.

For operating the platen I have secured to the shaft 389 an arm 412ª (see Figs. 5 and 58) having a series of openings 413 in it to which is adjustably secured, by means of a catch 414, a connecting rod 415 which is pivotally attached at its lower end to a lever 416 (see Fig. 2) pivotally attached at its rear end to the side 12 of the frame. The forward end of this lever is held against the periphery of the cam 378 by the spring 417, and as the cam 378 rotates the projection 377, forces the forward end of this bar 416 downwardly, and causes the connecting rod 415 to be drawn downwardly and hence operate the shaft 386 and the parts above described, which advance the platen. The adjustable features provided by the openings 413 and the catch 414 are to regulate the length of the stroke of the parts which drive the platen.

There is a hand piece 418 on the end of the shaft 405 by which the platen may be rotated manually, and there is a releasing catch 419 for throwing the pawl 411 out of contact with the gear 393, so that the platen may be rotated in either direction by the hand piece 418. The details of this catch are shown in Fig. 45.

Secured to the upper portion of the carrier frame 385, and extending transversely of the machine is a retaining plate 420 having a number of notches 421 in its forward edge, as shown in Fig. 43. Extending transversely of the printing mechanism and between extensions of the ends 390 and 391 of the platen frame are two shafts 422 and 423. Secured to the central portion of the shaft 423 is a catch 424 designed to enter any one of the notches 421 and lock the platen frame against longitudinal movement relative to the carrier frame 385. There is a thumb lever 425 on the outer end of the shaft 423 for throwing the catch 424 out of any one of the notches 421 and allow the platen frame to be shifted in either direction. There is a spring 426 on the shaft 423 connected to the end portion 390 of the platen frame for holding the catch in the particular notch in which it is placed.

Pivotally mounted on the shaft 422 are two bell crank levers 427 and 428, between the rear arms of which is mounted a paper bearing roller 429, upon which the roll of paper 430 is designed to be mounted. Between the other arms of the bell crank lever 427 I have provided a paper guide 431, shown in Fig. 45, and between the extreme outer ends of said arms there is a serrated knife 432, so arranged that as the paper passes between the guide 431 and the knife 432, the paper may be easily thrown against the serrated edge of the knife 342, and be severed from the roll. This paper roll is capable also of longitudinal movement on the shaft 422, and there is a set screw 433 for locking it in any desired position on said shaft.

On the interior of the platen 392 there is a mechanism for allowing the platen to be straightened for placing the paper in alinement. A detail description of this, however, is deemed unnecessary.

It will be seen by the use of the mechanism thus described, that when the paper is inserted between the platen 392 and the roller 396, it will be advanced to printing position so that the type bars may be forced against it, and the numbers printed on this paper by the mechanism heretofore described.

Mounted near the forward end of the under side of the carrier frame 385 is a roller 434 (as shown in Fig. 55). Connecting the carrier frame 385 with the curved supporting frame 380 is a spring 435 (see Fig. 55) for normally maintaining the said carrier frame in its normal position so that its right end is substantially in line with the right end of the supporting frame 380. Slidingly mounted between the right end of the carrier frame 385 and the supporting frame 380 is a lever 436 (see Figs. 5 and 55) having an inclined upper edge designed to engage the roller 434 as the lever 436 is moved upwardly, and force the carrier frame toward the left of the machine, so that the numbers on the type bar 358 will be printed in a different column when the carrier frame 385 and the platen frame mounted in it are thus shifted. The lower portion of the lever 436 is slidingly mounted in a support 437 (best shown in Figs. 56 and 57) on the inside of the side 13 of the frame, which support is slotted to permit the lever 436 to have a slight lateral play. There is a roller 438 on the extreme lower end of the lever 436, designed to engage a cam 439 secured to the subtracting shaft 131, so that as the subtracting lever is operated, the lever 436 will be moved upwardly and will shift the carrier frame 385 and the platen frame to a position for receiving the impressions of the type in a different column from that normally used. There is a spring 438ª for normally holding the lever 436 at its lower limit of movement.

Slidingly mounted in the support 437, and having in its lower end a cam groove 440 (see Fig. 56), through which the lever 436 passes, is a rod 441 secured at its upper end to a bell crank lever 442, which bell crank lever has secured to its upper arm a key stem 443 with a shifting key 444 on it. There is a catch 445 for holding this key at its lower limit of movement, which key will force the operating lever 436 into position where its roller 438 will engage the cam 439 and be operated by said cam.

"*The ribbon operating device.*"

Mounted in front of the platen carrier are two shafts 446 and 447, each of which is supported by a bearing 448 (see Fig. 5) at its upper end, and at their lower ends by the friction collars 449 and 450, as shown in Figs. 3 and 62. Secured to the upper end of the shaft 446 is a ribbon roller 451, as shown in Fig. 43. Mounted on the shaft 447 is a ribbon roller 452. These rollers are supported in a plane substantially parallel with the bottom 10 of the machine. Connecting these rollers is a ribbon 453 having two colors, each color of the ribbon running longitudinally of it. Near each end of the ribbon there is an operating lug 454 (see Fig. 59) designed to shift the mechanism which drives these ribbon rollers, and causes them to reverse their action, so that when the ribbon has been unwound off of the roller, it will be rewound on said roller. This ribbon passes through guide plates 455 and 456 secured to the rear portion of the frame 362, which hold this ribbon adjacent to the platen 392. Adjacent to the shafts 446 and 447 and extending downwardly from the top of the machine are two shafts 457 and 458, upon the upper ends of which are mounted the arms 459 and 460.

Pivotally attached to the arm 459 is an operating lever 461, having two engaging pins 462 at its outer end, between which the ribbon 453 slides until these pins are engaged by the operating lug 454 which causes the ribbon driving mechanism hereinafter described, to be reversed.

Pivotally attached to the arm 460 is an operating lever 463 having two pins 464 at its free end, between which the ribbon 453 passes until it is engaged by the lug 454 to reverse the operation of the ribbon rollers by the mechanism hereinafter described.

The purpose of the friction clamps 449 and 450 is to hold the ribbon 453 which is being wound and unwound from the ribbon rollers taut as they are operated, and also to support the lower ends of the shafts 446 and 447 respectively.

Secured to the shaft 446, and above the friction clamp 449 is a ratchet 465 having a driving pawl 466 mounted in operative relation thereto for driving the machine 465 in the direction indicated by the arrow, shown in Fig. 63.

Feathered to the shaft 447 is a ratchet 467 having a driving pawl 468 mounted in operative relation thereto for driving the ratchet 467 in the direction indicated by the arrow, shown in Fig. 63. Pivotally connecting the driving pawls 466 and 468 is a rod 469 designed to cause said pawls to be rocked simultaneously while one of them is driving and the other is not.

Mounted on the shaft 446 is a pawl releasing dog 470 designed to engage a pin 471 on the pawl 466 and force and retain said pawl out of driving position at the proper time.

Pivotally mounted to the shaft 447 is a similar pawl releasing dog 472, designed to engage a pin 473 on the pawl 468 for holding the pawl out of driving relation with the ratchet 467 at the proper time. Connecting these pawl releasing dogs 470 and 472 is a rod 474, designed to retain one of the pawls 466 or 468 out of driving relation with its ratchet while the other of said pawls is in the driving relation therewith.

Formed integral with the pawl releasing dog 472 is an arm 475. Secured to the lower end of the shafts 457 and 458 are two arms 476 and 477. Pivotally connecting these arms 476 and 477 is a rod 478. Pivotally attached at one end to the bar 477 and pivotally and slidingly attached to the arm 475 is an operating rod 479. Connecting an arm 480 which is attached to the side 12 of the frame, with the upper end of the arm 477, is a spring 481 designed to normally hold the mechanism which drives the ratchets 465 and 466 in the position shown in Fig. 63; that is, in position where the ratchet 465 will be driven, and with it the ribbon roller 451 to draw the ribbon from the roller 452. When the lug 454 engages the pins 462 of the operating arm 461, the shaft 458 is rocked against the resistance of the spring 481 to automatically force the pawl 466 out of driving relation with the ratchet 465 and allow the pawl 468 to be forced into driving relation with the ratchet 467 for causing the ribbon roller 458 to be rotated in such a way as to wind the ribbon upon it and unwind the ribbon from the roller 451.

Pivotally attached to the arm 482, which carries the ratchet 468, is an operating rod 483 which extends from this point of attachment across to the opposite side of the machine where it is pivotally attached to the crank 484 of the crank shaft 485, as shown in Fig. 2. The lower end of the crank shaft has mounted on it a roller 486 which is in contact with the periphery of the cam 878, and is so arranged that as the cam is rotated and the projection 377 engages this roller, it rocks the shaft 485 against the resistance of the spring 487 (which spring holds this rock shaft in a normal position) and draws the rod 483 toward the left of the machine, and drives the pawls 466 and 468 for operating whichever ratchet 465 or 467 said pawls are in driving relation to for operating the proper ribbon roller 451 or 452.

"*The ribbon shifting device.*"

Extending transversely of the machine and mounted in the sides 12 and 13 is a rock shaft 487ᵃ which is adjacent to the lower ends of the shafts 446 and 447, as shown in Figs. 2 and 62. Connecting the friction clamps 449 and 450 with the shaft 487 are the links 488 and 489. There is a spring 490, shown in Fig. 4, for holding the rock shaft 487ᵃ in its normal position, and the shafts 446 and 447 at their lower limits of movement. There is an arm 491 secured to the rock shaft 487ᵃ, to the upper end of which there is pivoted an operating rod 492, and this rod is pivotally attached at its forward end to a bell crank 493, which bell crank lever is pivotally mounted on the stub shaft 494, secured to the side 13 of the frame. To the rear arm of this bell crank lever I have secured a ribbon shifting key 495, so constructed that it can be locked at its lower limit of movement. When this key is pushed downwardly, the ribbon rollers 451 and 452 are shifted upwardly, so as to bring the lower part of the ribbon 453 in line with the type on the type bars 358 through the mechanism just described, and cause the numbers to be printed in a different color from that which is commonly used. This key operated ribbon roller shifting mechanism may be connected with the subtracting lever, if desired, for being operated automatically and simultaneously with the operation of the subtracting lever for printing all numbers subtracted in different color from that color used in adding.

"*The total taking mechanism.*"

The total taking calendar 342 has its series of notches 343 of diminishing distances from the shaft 341 for controlling the operation of the keys used in taking the total, as shown in Figs. 24 and 42. Extending transversely of the frame, and adjacent to the rear of the calculating wheel 118 is a rod supporting bar 496, through which a series of rods 497 extend to engage the peripheries of each of the total taking calendars 242.

Pivotally attached to the rear ends of the rods 497 is a series of arms 498 which are mounted on a shaft 499 extending transversely of the machine and mounted in the sides of the frame. Pivotally mounted on the shaft 499 and adjacent to each of the arms 498 is a locking bar 500 which has a pin 501 (see Fig. 65) near its pivotal end, designed to normally stand in engagement with a hook 502 on the adjacent arm 498. There is a spring 503 connecting the lower sides of the arm 498 and the locking bar 500 for normally holding the pin 501 against the hook 502, so that these parts will operate simultaneously in one direction.

Mounted at the outer ends of the shaft 499 and outside of the series of locking arms 500 are two shaft supporting arms 504 near the ends of the shaft 499, and outside of the series of locking arms 500, the rear ends of which are rigidly connected to an operating bar 505 which is normally held in engagement with the upper portion of each of the locking bars 500.

On the shaft 499 and in contact with the arms 504 are two arms 506, each having a hook 507 to engage a pin 508 on each of the arms 504 for causing the arms 504 to be operated simultaneously with the arms 506. The arms 506 are connected by a rod 509.

Pivotally connected to the arm 506 nearest the right side of the machine is a rod 510, which is pivotally and slidingly mounted at its forward end to a key bar 511, shown in Fig. 42, and this key bar 511 is pivotally mounted on the stub shaft 195, beneath the key-board, and secured to the right side of the machine. This key-bar has a key 513 connected with it by a key stem which extends up through the key-board.

Mounted on the forward end of the key-bar, and below its body portion is a roller 514, designed to act against the lower surface of the track 274, which is secured to the master-plate 198, as this master-plate is moved toward its forward limit of movement in taking totals. There is a spring 515 connected with the rod 510 at one end, and at its opposite end to the side 13 of the frame for normally supporting the free end of the key-bar 511 at its upper limit of movement, and also for supporting the parts attached to the shaft 499 in their normal positions.

Attached to the rear of the key bar 511 is a rod 516 (see Figs. 4, 31 and 42) which is pivotally and slidably attached at its lower end to an arm 517 which is rigidly secured to the rock shaft 52, hereinbefore described.

Extending transversely of the machine and rotatably mounted in the sides 12 and 13 below and slightly in front of the shaft 499, is a rock shaft 518. Secured near the ends of the shaft 518 are two operating arms 519 and 520, the lower ends of which are connected by a shaft 521, shown in Figs. 3 and 42. Mounted on the shaft 518, between the arms 519 and 520 is a series of bell cranks, each of which has a forward operating arm 73 which is pivotally connected with the rear end of the rod 72, and a rear toothed retaining arm 523, the teeth 524 of which are designed to be engaged by the locking bar 500 adjacent to it when the total is being taken.

Rigidly secured to the right end of the shaft 518 and outside of the arm 519 is a locking pawl 525, having a rod 526 pivotally attached to its lower end. The forward end of said rod 526 is slidably mounted in an eye support 527, secured to the rear end of the master-plate, and is so arranged that the master-plate can move freely without operating this rod, as shown in Fig. 4. There is a head 528 on the rod 526 designed to be engaged by the eye support 527 sufficiently to rock the pawl 525 very slightly on each stroke of the master-plate. When the pawl is released, the rod 526 will be moved to position where the master-plate will move it through a considerable distance for operating the parts connected with it.

Connecting the rear end of the arm 498 with the toothed retaining arm 523 is a spring 529 for drawing the parts, to which it is attached, into operative position when the totaling key is depressed.

Pivotally mounted on a stub shaft 530, secured to the side 13, is a catch 531 designed to engage the pawl 525 and hold it in normal position until released by the totaling key. This catch has pivotally attached to its lower arm a rod 532, the forward end of which d is pivotally attached to the rod 510. There is a spring 533 connected with the forward portion of this catch 531, at one end, and at its other to the side 13 of the frame, for holding the catch in locked position against the pawl 525.

Extending transversely of the machine and immediately at the rear of the keys in the key-board and adjacent to the rear end of the locking plate 22, is a shaft 534, having a rock arm 535 at each end of it, between which rock arms the rod 536 is mounted, which rod enters a slot 537 in each of the locking plates 22, as best shown in Fig. 6.

Secured near the right end of the shaft 534 is an operating arm 538, as best shown in Fig. 31. Secured at one end to the upper portion of the operating arm 538 and at its other end to the side 13 of the frame is a spring 539. Pivotally mounted on the shaft 195 and immediately inside of the key bar 511 is a spring maintained dog 540 which is normally held against the pin 541 secured to the side 13, and against the lower portion of the operating arm 538 by the spring 542, mounted on the shaft 195, and having its ends engage the key-bar 511 and a pin 543 on the dog 540, as shown in Fig. 31.

Rigidly secured to the shaft 534 and extending downwardly therefrom is an operating arm 544 (see Fig. 32) which engages at its lower end a pin 545 on the right side of the master-plate 199 by which it is operated as the master-plate is operated. The pin 543 is engaged by a projection 546 on the key bar 511 for throwing the dog 540 out of engagement with the operating lever 538 when the totaling key is depressed. When this key has been thus depressed, the spring 539 causes the shaft 534 to be rocked and simultaneously slides the locking plate rearwardly to move the slots in this locking plate, in which the projections 20 on the keys normally move up and down out of alinement with those projections. In this way the keys are locked at their upper limits of movement and prevented from being operated while the total is being taken.

After the total operation has been completed, the master-plate, through the lever 544 and the pin 545, causes the locking plate to be thrown to its normal position with the slots in the locking plate 22 in a line with the projections 20.

"*Operation of the totaling mechanism.*"

In operating the machine for taking totals, the adding lever is drawn forwardly to move the master-plate 198 to its forward limit of movement. (This may be done at the time of adding the last number into the machine). When the master-plate is at its forward limit of movement, the total key 513 is depressed, thus forcing the roller 514 against the inclined face 276 (see Fig. 37) of the block 275, forcing this block rearwardly and allowing the roller to pass through an opening in the track 274 which was beneath said block and then allow the block to be moved forwardly until its under portion is engaged by said roller for holding the key in a depressed position, which causes the rod 510 to be drawn forwardly, and the forward end of the arm to be swung forwardly and the shaft 505 to be raised against resistance of the spring 515. This allows the rear ends of all of the bars 500 to be swung upwardly, and the forward end of the arms 498 to be drawn forwardly by the spring 529, thus forcing the forward ends of the rods 497 into the proper notch 343 in the calendar 342 for determining the positions of the locking bars 500 as this rod 497 limits the movements of certain of the arms, depending upon whether the particular section of the machine has any numbers calculated into it. The remainder of the bars 500 are drawn upwardly into engagement with the shaft 505.

At the time the totaling key is depressed, the catch 531 is released from its engagement with the pawl 525, and at the same time the rod 516 is drawn upwardly, causing the shaft 52 to be rocked and the bars 58 to be drawn upwardly so that the hook 68 of the carriage 65 is immediately above the hook 71 on each of the key bars 28. The raising of the bars 58 also raises the bar 256 and draws the dog 258 into position where it will be depressed by the roller 253 on the forward end of the master-plate on its return stroke and be engaged by said roller on its next forward stroke.

At the time the total key 513 is depressed the pin 513' on the forward end of the key lever 511 (see Fig. 4) engages the projection 191 on the printing key stem 187, so that the printing button is depressed for throwing the calculating mechanism out of operation and allowing the printing mechanism to be used independently of this.

When the above operations have been performed, the adding lever, which has been held at its forward limit of movement while the total key was being depressed, is released and the master-plate is drawn rearwardly by the spring 240. This causes the totaling key to be held at its lower limit of movement, as shown in Fig. 42, by its engagement with the under surface of the track 274, as the master-plate moves rearwardly. As the master-plate moves rearwardly, the shaft 518 is allowed to be rocked by the springs 529 owing to the fact that the catch 531 has already been released, and to the fact that the rod 526 is allowed to travel rearwardly with the master-plate. The toothed retaining arms 523 are drawn upwardly until the proper tooth $1^d$, $2^d$, $3^d$, $4^d$, $5^d$, $6^d$, $7^d$, $8^d$, $9^d$, in each of them is engaged by one of the locking bars 500 for stopping the upward movement of the toothed retaining arm in the proper position for bringing the hook 68 of the carriage 65 into engagement with the hook 71 on the key bars which are beneath the keys corresponding to the numbers to be printed in the total.

It will be seen that owing to this construction, and owing to the construction of the calendar 342, the hooks 68 of the carriage 65 will be properly positioned relative to the hooks 71, owing to the movement of the carriage in the channel 59, by the rod 72 and the arm 522. When the master-plate reaches its rearward limit of movement, the totaling key 513 is released, owing to the fact that the track 274 is drawn out of engagement with the roller 514. This allows the spring 515 to draw the rod 510 rearwardly, which causes the arm 498 to be swung rearwardly, and draws the rod 497 rearwardly out of engagement with the calendar 342 without releasing the locking bars 500 which are in engagement with the toothed retaining arm 523. The adding lever is then drawn forwardly to draw the master-plate to its forward limit of movement which causes the roller 253 to engage the rear portion of the dog 258 for forcing the bar 256 downwardly and the bar 260 upwardly and the bar 58 downwardly for drawing the key bars 28 downwardly, and set these key bars for the printing operation automatically for printing the total and carrying out the printing operation on the numbers forming the total in the same manner as if these key bars had been depressed by hand. While the masterplate is moving forwardly, a pin engages the projection 192 on the printing key, which releases it and allows it to move to its upper limit of movement, and as the master-plate moves to its rearward limit of movement and normal position, the remaining parts of the device are brought to their normal position for further use.

"Clearing the machine."

When it is desired to take the numbers which form the total out of the machine, this is done by pressing the total button downwardly and operating the subtracting lever, which causes the calculating wheels to be rotated in the subtracting direction until all of these are at their point of starting. In the latter operation, the calculating wheels are rotated, owing to the construction of the mechanism operated by the subtracting lever, while in the operation of taking the totals, the adding wheels are not operated.

The printing button in the operation of taking totals is used to throw the calculating rack out of operative relation with the calculating wheels, while in clearing the machine, this result is accomplished by the printing mechanism, owing to the fact that in the totaling operation the bar 183 is controlled to throw the operating arm 125 into the neutral position, shown in Fig. 34, while in clearing the machine, the bar 161 is used to throw the operating arm 125 into operative relation with the subtracting cam 180, and hence cause the numbers forming the total to be rotated back to their normal position.

"General operation."

From the above description of the operative relation of the parts set out, it is believed that a general statement of the operation is unnecessary, except to state in a general way that each key in each of the rows of keys forming the sections of the machine, controls the operations of adding and subtracting by positive mechanisms automatically after any given key, or a number of keys has been set. The keys in a given row regulate the calculating section corresponding with, and immediately behind said keys in a given section, and also regulate the parts of the printing mechanism, corresponding with said section.

When a key in a single section, or one key in each of a number of rows has been set to indicate the number which is to be added into the machine, the adding lever is operated to carry the amounts indicated by the keys into the calculating wheels, and print this amount through the printing mechanism. The parts of the machine are then brought to normal position automatically, and by positive mechanisms so that the danger of not clearing the machine at each operation is obviated to a very large extent.

When a number is wrongly added into the machine, this can be subtracted out by pressing the keys corresponding to the number which has been last printed, as clearly shown on the paper in the printing mechanism, and operating the subtracting lever, which reverses the operation of the machine, subtracts the number thus desired to be subtracted out, and lists this number through the mechanism described, within a separate column in a different color, or in the same column in a different color, or with an indicating mark after it to show clearly the numbers which have been thus rectified.

When the printing button is locked at its lower limit of movement, the machine will list without in any way affecting the calculating mechanism, and hence an amount which has been calculated into the machine may remain in the machine during the listing process when the printing button has been depressed. When the listing has been completed, the user of the machine may go on calculating into the machine new numbers, taking the work up where he left off prior to his listing.

In taking the totals, my machine is particularly advantageous in that it uses the key bars which correspond with the total in automatically printing this total by the use of the adding lever, and in locking the keys at their upper limits of movement while the total is being taken to prevent any errors occurring while the total is being taken, and in clearing the machine this same result is accomplished by the use of the subtracting lever in connection with the calculating mechanism.

Having thus described my invention, what I claim and desire to secure by Letters Patent of the United States, therefor is—

1. In a calculating machine, a series of calculating wheels, an adding lever, a subtracting lever, means in operative relation with each of the calculating wheels, and the adding and subtracting levers for operating the calculating wheels in opposite directions.

2. In a calculating machine, a series of calculating wheels, an adding lever, a subtracting lever, and key-controlled means in operative relation with each of the calculating wheels, and the adding and subtracting levers for operating the calculating wheels in opposite directions.

3. In a calculating machine, a series of calculating wheels, an adding lever, a subtracting lever, and key controlled pin regulating means in operative relation with each of the calculating wheels, and the adding and subtracting levers for operating the calculating wheels in opposite directions.

4. In a calculating machine, a series of calculating wheels, an adding lever, a subtracting lever, means in operative relation with each of the calculating wheels, and the adding and subtracting levers for operating the calculating wheels in opposite directions, and a printing mechanism operatively connected with said means, and designed to be actuated by said means as the adding or subtracting lever is operated.

5. In a calculating machine, a series of calculating wheels, an adding lever, a subtracting lever, key controlled means in operative relation with each of the calculating wheels, and the adding and subtracting levers for operating the calculating wheels in opposite directions, and a printing mechanism operatively connected with said means and designed to be actuated by said means as the adding or subtracting lever is operated.

6. In a calculating machine, a series of calculating wheels, an adding lever, a subtracting lever, key controlled pin regulating means in operative relation with each of the calculating wheels, and the adding and subtracting levers for operating the calculating wheels in opposite directions, and a printing mechanism operatively connected with said means and designed to be actuated by said means as the adding or subtracting lever is operated.

7. In a calculating machine, a key-controlled calculating device, an adding and a subtracting lever for operating said calculating device to add or subtract, and a printing mechanism operatively connected with said calculating device for printing the amounts added or subtracted upon each operation of the calculating device.

8. In a calculating machine, a key-controlled calculating mechanism, an adding and a subtracting lever for operating said calculating mechanism to add or subtract, a printing mechanism operatively connected with said calculating mechanism for printing the amounts added or subtracted upon each operation of the calculating mechanism, and a totaling mechanism operatively connected with and forming a part of the calculating mechanism, designed to be operated by the adding lever.

9. In a calculating machine, a key-controlled, automatic calculating mechanism for adding or subtracting, an adding lever, a subtracting lever, operative connections between said calculating mechanism and said levers for throwing said mechanism into or out of operation, and means for automatically returning said levers and said connections to normal position after the completion of the addition or subtraction.

10. In a calculating machine, a key-controlled, automatic calculating mechanism for adding or subtracting, an adding lever, a subtracting lever, operative connections between said calculating mechanism and said levers for throwing said mechanism into and out of operation, means for automatically returning said lever and said connections to normal position after the completion of the addition or subtraction, and a printing mechanism operatively conected with the calculating mechanism for automatically printing the numbers which are added or subtracted.

11. In a calculating machine, a key-controlled printing mechanism, a calculating mechanism, means for throwing the calculating mechanism out of operation while the printing mechanism is being operated, an adding lever for operating said calculating mechanism in a positive direction, and a subtracting lever for operating said calculating mechanism in a negative direction, said adding lever being adapted to operate the printing mechanism when the calculating mechanism is thrown out of operation.

12. In a calculating machine, a series of key-sections independent of each other, a calculating section for each key section, a printing section, means operatively connected with the calculating sections and controlled by the keys in the key sections for automatically actuating the calculating sections, and a pair of levers for setting said actuating means into operation to actuate the calculating sections in the adding or subtracting direction.

13. In a calculating machine, a frame, a series of key sections removably mounted in the forward position of the frame, a series of calculating sections mounted at the rear of the key sections and above the same, means set by one of the keys in certain of the key sections for automatically operating calculating sections for adding or subtracting, an adding lever, a subtracting lever, and operative connections between said levers and said operating means.

14. In a calculating machine, a frame, a series of key sections removably mounted in the forward portion of the frame, a series of calculating sections mounted at the rear of the key sections and above the same, means set by one of the keys in certain of the key sections for automatically operating the calculating sections for adding or subtracting, an adding lever, a subtracting lever, operative connections between said levers and said operating means, and a printing mechanism operatively connected with said first mentioned means and designed to operate simultaneously therewith.

15. In a calculating machine, a series of calculating mechanisms, a calculating wheel in each of the calculating mechanisms, racks designed to be thrown into or out of engagement with the calculating wheels, a series of rows of keys, each of the keys in each row of keys designed to control the action of the calculating mechanism, an adding and a subtracting lever for operating the rack vertically to co-act with the calculating wheels for adding and subtracting.

16. In a calculating machine, a series of calculating mechanisms, a calculating wheel in each of the calculating mechanisms, racks designed to be thrown into or out of engagement with the calculating wheels, a series of rows of keys, each of the keys in each row of keys designed to control the action of the calculating mechanism, an adding and a subtracting lever for operating the rack vertically to co-act with the calculating wheels for adding and subtracting, and means set by each of the keys as they are depressed for locking the other keys in the same key section out of operation until the depressed key has been returned to its normal position.

17. In a calculating machine, a series of calculating mechanisms, a calculating wheel in each of the calculating mechanisms, racks designed to be thrown into or out of engagement with the calculating wheels, a series of rows of keys, each of the keys in each row of keys designed to control the action of the calculating mechanism, an adding and a subtracting lever for operating the rack vertically to co-act with the calculating wheels for adding and subtracting, and spring means for returning the keys to their normal position.

18. In a calculating machine, a series of calculating mechanisms, a calculating wheel in each of the calculating mechanisms, racks designed to be thrown into or out of engagement with the calculating wheels, a series of rows of keys, each of the keys in each row of keys designed to control the action of the calculating mechanism, an adding and a subtracting lever for operating the rack vertically to co-act with the calculating wheels for adding and subtracting, spring means for returning the keys to their normal position, and positive means supplementing the spring means for returning the keys to their normal position.

19. In a calculating machine, a series of calculating mechanisms, a calculating wheel in each of the calculating mechanisms, racks designed to be thrown into or out of engagement with the calculating wheels, a series of rows of keys, each of the keys in each row of keys designed to control the action of the calculating mechanisms, an adding and a subtracting lever for operating the rack vertically to co-act with the calculating wheels for adding and subtracting, means set by each of the keys as they are depressed for locking the other keys in the same key section out of operation until the depressed key has been returned to its normal position, and spring means for returning the keys to their normal position.

20. In a calculating machine, a series of calculating mechanism, a calculating wheel in each of the calculating mechanisms, racks designed to be thrown into or out of engagement with the calculating wheels, a series of rows of keys, each of the keys in each row of keys designed to control the action of the calculating mechanism, an adding and a subtracting lever for operating the rack vertically to co-act with the calculating wheels for adding and subtracting, spring means for returning the keys to their normal position, and positive means supplementing the spring means for returning the keys to their normal position.

21. In a calculating machine, a calculating mechanism, a series of calculating sections in the calculating mechanism, each of which is detachably mounted in the machine, and the parts of which are detachably connected with each other, a calculating wheel in each calculating section, designed to be rotated in opposite directions for adding and subtracting, a calculating rack for each of the calculating wheels, and pin regulated means for driving the rack vertically for rotating the calculating wheels in either direction.

22. In a calculating machine, a calculating mechanism, a series of calculating sections in the calculating mechanism, each of which is detachably mounted in the machine, and the parts of which are detachably connected with each other, a calculating wheel in each calculating section, designed to be rotated in opposite directions for adding and subtracting, a calculating rack for each of the calculating wheels, pin regulated means for driving the rack vertically for rotating the calculating wheels in either direction, and keys for setting the pins in the pin regulated means.

23. In a calculating machine, a calculating mechanism, a series of calculating sections in the calculating mechanism, each of which is detachably mounted in the machine, and the parts of which are detachably connected with each other, a calculating wheel in each calculating section, designed to be rotated in opposite directions for adding and subtracting, a calculating rack for each of the calculating wheels, pin regulated means for driving the rack vertically for rotating the calculating wheels in either direction, keys for setting the pins in the pin regulated means, and a locking device actuated by each key as depressed for locking the other keys in a given section out of operation until the depressed key returns to its normal position.

24. In a calculating machine, a calculating mechanism, a series of calculating sections in the calculating mechanism, a calculating wheel in each calculating section, a series of racks designed to be automatically thrown into and out of operation with the calculating wheels, a pin bearing frame operatively connected with each of the racks, a series of rows of keys, the keys in which are designed to set the pins in the pin bearing frame, a safety lock device operated by depressing any key for locking the other keys out of operation after one key has been depressed or partially depressed, and means for operating the pin bearing frame.

25. In a calculating machine, a calculating mechanism, a series of calculating sections in the calculating mechanism, a calculating wheel in each calculating section, a series of racks designed to be automatically thrown into and out of operation with the calculating wheels, a pin bearing frame operatively designed to be automatically thrown into and out of operation with the calculating wheels, a pin bearing frame operatively connected with each of the racks, a series of rows of keys, the keys in which are designed to set the pins in the pin bearing frame, a safety lock device operated by depressing any key for locking the other keys out of operation after one key has been depressed or partially depressed, means for positively returning the keys to their normal position after the adding and subtracting has been accomplished, and means for operating the pin bearing frame.

26. In a calculating machine, a calculating mechanism, a series of calculating sections in the calculating mechanism, a calculating wheel in each calculating section, a series of racks, designed to be automatically thrown into and out of operation with the calculating wheels, a pin bearing frame operatively connected with each of the racks, a series of rows of keys, the keys in which are designed to set the pins in the pin bearing frame, means for operating the pin bearing frame, and a master-plate operatively connected with the racks and with the pin bearing frames, springs connected with the master-plate, an adding and a subtracting lever for drawing the master-plate to its forward limit of movement and placing the springs under tension for operating the rack and the pin bearing frames, and the parts connected therewith.

27. In a calculating machine, a calculating mechanism, a series of calculating sections in the calculating mechanism, a calculating wheel in each calculating section, a series of racks, designed to be automatically thrown into and out of operation with the calculating wheels, a pin bearing frame operatively connected with each of the racks, a series of rows of keys, the keys in which are designed to set the pins in the pin bearing frame, means for operating the pin bearing frame, a master-plate operatively connected with the racks and with the pin bearing frames, springs connected with the master-plate, an adding and a subtracting lever for drawing the master-plate to its forward limit of movement and placing the springs under tension for operating the rack and pin bearing frame, and the parts connected therewith, and a printing mechanism operatively connected with the pin bearing frame.

28. In a calculating machine, a calculating mechanism, a series of calculating sections in the calculating mechanism, a calculating wheel in each calculating section, a series of racks, designed to be automatically thrown into and out of operation with the calculating wheels, a pin bearing frame operatively connected with each of the racks, a series of rows of keys, the keys in which are designed to set the pins in the pin bearing frame, means for operating the pin bearing frame, a master-plate operatively connected with the racks and with the pin bearing frames, springs connected with the master-plate, an adding and a subtracting lever for drawing the master-plate to its forward limit of movement and placing the springs under tension for operating the rack and the pin bearing frame, and the parts connected therewith, a printing mechanism connected with the pin bearing frame, and means for throwing the rack out of operative relation with the parts of the calculating wheels while the printing mechanism is being operated.

29. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, and an adding and a subtracting lever for moving the master-plate to its forward limit of movement for placing the springs under tension for operating the racks.

30. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate, and with the racks, an adding and a subtracting lever for moving the master-plate to its forward limit of movement for placing the springs under tension for operating the racks, a series of pin bearing frames operatively connected with the racks, a series of pins in each of the pin bearing frames, and means for setting the pins in the pin bearing frame to control the operation of the racks.

31. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, an adding and a subtracting lever for moving the master-plate to its forward limit of movement for placing the springs under tension for operating the racks, a series of pin bearing frames operatively connected with the racks, a series of pins in each of the pin bearing frames, and a series of keys having means connected therewith for setting the pins in the pin bearing frames.

32. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, an adding and a subtracting lever for moving the master-plate to its forward limit of movement for placing the springs under tension for operating the racks, a series of pin bearing frames operatively connected with the racks, a series of pins in each of the pin bearing frames, a series of keys having means connected therewith for setting the pins in the pin bearing frames, and means for locking the keys in a given row out of operation after one key has been depressed.

33. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master plate and with the racks, an adding and a subtracting lever for moving the master-plate to its forward limit of movement for placing the springs under tension for operating the racks, a series of pin bearing frames operatively connected with the racks, a series of pins in each of the pin bearing frames, a series of keys having means connected therewith for setting the pins in the pin bearing frames, means for locking the keys in a given row out of operation after one key has been depressed, and means for retaining the keys at their lower limits of movement until automatically released and returned to their normal limits of movement.

34. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, an adding and a subtracting lever for moving the master plate to its forward limit of movement for placing the springs under tension for operating the racks, a series of pin bearing frames operatively connected with the racks, a series of pins in each of the pin bearing frames, a series of keys having means connected therewith for setting the pins in the pin bearing frames, and means for retaining the keys at their lower limits of movement until automatically released and returned to their normal limits of movement.

35. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, an adding and a subtracting lever for moving the master-plate to its forward limit of movement for placing the springs under tension for operating the racks, a series of pin bearing frames operatively connected with the racks, a series of pins in each of the pin bearing frames, a series of keys having means connected therewith for setting the pins in the pin bearing frames, means for locking the keys in a given row out of operation after one key has been depressed, means for retaining the keys at their lower limits of movement until automatically released and returned to their normal limits of movement, and means for returning the keys to their normal limits of movement.

36. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, an adding and a subtracting lever for moving the master-plate to its forward limit of movement for placing the springs under tension for operating the racks, a series of pin bearing frames operatively connected with the racks, a series of pins in each of the pin bearing frames, a series of keys having means connected therewith for setting the pins in the pin bearing frames, means for retaining the keys at their lower limits of movement until automatically released and returned to their normal limits of movement, and means for returning the keys to their normal limits of movement.

37. In a calculating machine, a printing mechanism, a master-plate operatively connected with the printing mechanism, a pin bearing frame operatively connected with the master-plate, keys for setting the pins in the pin bearing frame, an adding and a subtracting lever for drawing the master-plate to its forward limit of movement.

38. In a calculating machine, a series of key sections, at the front of the machine and removably connected with it, a series of pin controlled frames at the rear of the key sections and controlled by the keys in the key section, a series of calculating sections operatively connected with the pin bearing frames, an adding and a subtracting lever for putting said means into operation for operating the pin bearing frame, and the calculating sections into operation.

39. In a calculating machine, a series of key sections, at the front of the machine and removably connected with it, a series of pin controlled frames at the rear of the key sections and controlled by the keys in the key section, a series of calculating sections operatively connected with the pin bearing frames, an adding and a subtracting lever for putting said means into operation for operating the pin bearing frame, and the calculating sections into operation, a printing mechanism operatively connected with said means, a printing button for throwing the calculating mechanism out of operation and allowing the printing mechanism to be operated without in any way affecting the calculating operations of the machine.

40. In a calculating machine, a series of key sections, at the front of the machine and removably connected with it, a series of pin controlled frames at the rear of the key sections and controlled by the keys in the key section, a series of detachably mounted calculating sections operatively connected with the pin bearing frames, and an adding and a subtracting lever for putting said means into operation for operating the pin bearing frame, and the calculating sections into operation.

41. In a calculating machine, a series of key sections at the front of the machine and removably connected with it, a series of pin controlled frames at the rear of the key sections and controlled by the keys in the key section, a series of detachably mounted calculating sections operatively connected with the pin bearing frames, an adding and a subtracting lever for putting said means into operation for operating the pin bearing frame, and the calculating sections into operation, a printing mechanism operatively connected with said means, and a printing button for throwing the calculating mechanism out of operation and allowing the printing mechanism to be operated without in any way affecting the calculating operations of the machine.

42. In a calculating machine, a series of calculating wheels, means for rotating the calculating wheels in opposite directions, a calculating mechanism for controlling the operation of these wheels and transferring the numbers added or subtracted by the wheels from one section to an adjacent section, an adding and a subtracting lever for throwing said means into operation, and a printing mechanism operatively connected with said means and capable of being thrown into and out of operation in conjunction with, or separate and apart from the operation of the calculating wheels.

43. In a calculating machine, a series of calculating wheels, means for rotating the calculating wheels in opposite directions, a calculating mechanism for controlling the operation of these wheels and transferring the numbers added or subtracted by the wheels from one section to an adjacent section, an adding and a subtracting lever for throwing said means into operation, and a printing mechanism operatively connected with said means and capable of being thrown into and out of operation in conjunction with or separate and apart from the operation of the calculating wheels.

44. In a calculating machine, a series of calculating wheels, means for rotating the calculating wheels in opposite directions, a calculating mechanism for controlling the operation of these wheels and transferring the numbers added or subtracted by the wheels from one section to an adjacent section, an adding and a subtracting lever for throwing said means into operation, a printing mechanism operatively connected with said means and capable of being thrown into and out of operation in conjunction with, or separate and apart from the operation of the calculating wheels and keys for controlling the action of said means and regulating the rotation of the calculating wheels.

45. In a calculating machine, a calculating mechanism for adding and subtracting, an adding and a subtracting lever, each of which is designed to operate the calculating mechanism.

46. In a calculating machine, a calculating mechanism, for adding and subtracting, an adding and a subtracting lever, each of which is designed to operate the calculating mechanism, and a printing mechanism operatively connected with the calculating mechanism.

47. In a calculating machine, a calculating mechanism for adding and subtracting, an adding and a subtracting lever, each of which is designed to operate the calculating mechanism, a printing mechanism operatively connected with the calculating mechanism, and means for holding the calculating mechanism out of operation during the operation of the printing mechanism.

48. In a calculating machine, a calculating mechanism for adding and subtracting, an adding and a subtracting lever, each of which is designed to operate the calculating mechanism, and means operatively connected with the adding and the subtracting lever for holding one out of operation while the other is being operated.

49. In a calculating machine, a calculating mechanism, for adding and subtracting, an adding and a subtracting lever, each of which is designed to operate the calculating mechanism, a printing mechanism operatively connected with the calculating mechanism, and means operatively connected with the adding and the subtracting lever for holding one out of operation while the other is being operated.

50. In a calculating machine, a calculating mechanism for adding and subtracting, an adding and a subtracting lever, each of which is designed to operate the calculating mechanism, a printing mechanism operatively connected with the calculating mechanism, means for holding the calculating mechanism out of operation during the operation of the printing mechanism, and means operatively connected with the adding and the subtracting lever for holding one out of operation while the other is being operated.

51. In a calculating machine, a series of calculating wheels, means for rotating the calculating wheels, means for controlling the operation of the calculating wheels, an adding lever for throwing said means into operation and causing the calculating means to add, and a subtracting lever for operating said means in such a way as to throw the adding mechanisms into subtracting positions and causing the calculating mechanism to subtract.

52. In a calculating machine, a series of rows of key bars, a printing mechanism, a calculating mechanism, means operatively connected with the calculating and printing mechanisms for drawing the key bars downwardly and causing the total of the numbers which have been calculated into the machine to be printed by the printing mechanism, and means actuated by the subtracting lever for clearing the machine and turning the calculating wheels to their zero position.

53. In a calculating machine, a series of rows of key bars, a printing mechanism, a calculating mechanism, means operatively connected with the calculating and printing mechanisms for drawing the key bars downwardly and causing the total of the numbers which have been calculated into the machine to be printed by the printing mechanism, a totaling key for throwing said means into operative position, and means actuated by the subtracting lever for clearing the machine and turning the calculating wheels to their zero position.

54. In a calculating machine, a series of rows of key bars, a printing mechanism, a calculating mechanism, means operatively connected with the calculating and printing mechanisms for drawing the key bars downwardly and causing the total of the numbers which have been calculated into the machine to be printed by the printing mechanism, a totaling key for throwing said means into operative position, an adding lever for operating said total mechanism, and means actuated by the subtracting lever for clearing the machine and turning the calculating wheels to the zero position.

55. In a calculating machine, a key controlled pin driven automatic calculating mechanism, an adding and a subtracting lever for throwing the calculating mechanism into and out of operation for adding or subtracting, whereby the parts are returned to their normal position after the completion of the addition or subtraction, a printing mechanism operatively connected with the calculating mechanism for automatically printing the numbers which are added or subtracted, a carriage in the printing mechanism, and means for automatically shifting the carriage when the subtracting lever is operated to list the subtracted numbers in a column separate from the column used in listing the added numbers.

56. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, an adding and a subtracting lever for moving the mater-plate to its forward limit of movement for placing the springs under tension for operating the racks, and means for regulating the operative action of the spring.

57. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, an adding and a subtracting lever for moving the master-plate to its forward limit of movement for placing the springs under tension for operating the racks, means for regulating the operative action of the spring, a series of pin bearing frames operatively connected with the racks, a series of pins in each of the pin bearing frames, and means for setting the pins in the pin bearing frame to control the operation of the racks.

58. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, an adding and a subtracting lever for moving the master-plate to its forward limit of movement for placing the springs under tension for operating the racks, means for regulating the operative action of the spring, and a series of keys having means connected therewith for setting the pins in the pin bearing frames.

59. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, an adding and a subtracting lever for moving the master-plate to its forward limit of movement for placing the springs under tension for operating the racks, means for regulating the operative action of the spring, a series of keys having means connected therewith for setting the pins in the pin bearing frame, and means for locking the keys in a given row out of operation after one key has been depressed.

60. In a calculating machine, a calculating mechanism, a series of calculating sections in the calculating mechanism, a calculating wheel in each calculating section, a series of racks designed to be automatically thrown into and out of operation with the calculating section, a series of racks designed to be automatically thrown into and out of operation with the calculating wheels, a master-plate, springs operatively connected with the master-plate and with the racks, an adding and a subtracting lever for moving the master-plate to its forward limit of movement for placing the springs under tension for operating the racks, means for regulating the operative action of the spring, a series of keys having means connected therewith for setting the pins in the pin bearing frames, and means for retaining the keys at their lower limits of movement until automatically released and returned to their normal limits of movements.

61. In a calculating machine, a calculating mechanism, a series of calculating sections in the calculating mechanism, a calculating wheel in each calculating section, a series of racks designed to be automatically thrown into and out of operation with the calculating wheels, a master-plate, springs operatively connected with the master-plate and with the racks, an adding and a subtracting lever for moving the master-plate to its forward limit of movement for placing the springs under tension for operating the racks, means for regulating the operative action of the spring, a series of keys having means connected therewith for setting the pins in the pin bearing frames, and means for returning the keys to their normal limit of movement.

Des Moines, Iowa, March 21, 1908.

MARTIN TEETOR.

Witnesses:
S. F. CHRISTY,
M. E. BENNETT.